United States Patent
Hull et al.

(10) Patent No.: US 10,783,659 B1
(45) Date of Patent: Sep. 22, 2020

(54) HOLE LOCATION TARGETS AND MEASUREMENT SYSTEMS, AND METHODS FOR MEASURING A LOCATION OF A HOLE

(71) Applicant: The Boeing Company, Chicago, IL (US)

(72) Inventors: Jerald A. Hull, Charleston, SC (US); Philip L. Freeman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/456,312

(22) Filed: Jun. 28, 2019

(51) Int. Cl.
*G06K 7/10* (2006.01)
*G06T 7/73* (2017.01)
*G01B 11/00* (2006.01)
*G06K 7/14* (2006.01)

(52) U.S. Cl.
CPC .............. *G06T 7/73* (2017.01); *G01B 11/002* (2013.01); *G06K 7/10722* (2013.01); *G06K 7/1417* (2013.01); *G06T 2207/30172* (2013.01); *G06T 2207/30204* (2013.01)

(58) Field of Classification Search
CPC .... G06T 7/73; G01B 11/002; G06K 7/10722; G06K 7/1417

USPC .................................................... 235/462.11
See application file for complete search history.

(56) References Cited

U.S. PATENT DOCUMENTS

| | | | |
|---|---|---|---|
| 7,759,617 | B2 | 7/2010 | Bowles et al. |
| 2018/0208328 | A1 | 7/2018 | Charlton et al. |
| 2019/0003823 | A1 | 1/2019 | Hull |

OTHER PUBLICATIONS

FaroArm, Faro Technologies, https://www.faro.com/products/3d-manufacturing/faroarm/.
Romer Arm, Hexagon Manufacturing Intelligence, http://us.ROMER.com.
Hubbs Machine, Hubbs Machine & Manufacturing Inc., http://hubbsmachine.com.

*Primary Examiner* — Daniel A Hess
(74) *Attorney, Agent, or Firm* — Walters & Wasylyna LLC

(57) ABSTRACT

A hole location target includes a self-centering insert having a centerline and an optical target attached to the self-centering insert at a fixed position relative to the centerline of the self-centering insert. The optical target includes a light-emitting display. The light-emitting display includes a two-dimensional pattern thereon.

22 Claims, 22 Drawing Sheets

HOLE LOCATION TARGETS AND MEASUREMENT SYSTEMS, AND METHODS FOR MEASURING A LOCATION OF A HOLE

FIELD

The present application relates to the field of hole location targets, hole location measurement systems, and methods for measuring a location of a hole.

BACKGROUND

Touch-based coordinate measurement machines typically use a stylus to sweep an inside surface of a hole of a workpiece to determine a centerline of the hole, which takes significant time. Also, articles having holes to be measured by this technique are typically specifically designed to permit for insertion of and sweeping by a stylus of a touch-based coordinate measurement machine, thus restricting freedom of design.

Accordingly, those skilled in the art continue with research and development in the field of hole location targets, hole location measurement systems, and methods for measuring a location of a hole.

SUMMARY

According to a first embodiment, a hole location target includes a self-centering insert having a centerline and an optical target attached to the self-centering insert at a fixed position relative to the centerline of the self-centering insert. The optical target includes a two-dimensional pattern thereon.

According to the first embodiment, a hole location measurement system includes a hole location target, a camera system, and a computer system. The hole location target includes a self-centering insert having a centerline and an optical target attached to the self-centering insert at a fixed position relative to the centerline of the self-centering insert, in which the optical target includes a two-dimensional pattern thereon. The camera system is configured to capture images of the two-dimensional pattern on the optical target. The computer system is configured to measure three-dimensional locations of features of the two-dimensional pattern on the optical target and to extract a location of a cylinder axis of the cylinder surface geometry.

According to the first embodiment, a method for measuring a location of a hole includes centering an insert within a hole having a centerline. The optical target includes a two-dimensional pattern thereon at a fixed position relative to the centerline of the insert. The method further includes capturing images of the two-dimensional pattern on the optical target, measuring three-dimensional locations of features of the two-dimensional pattern on the optical target, and extracting a location of the centerline of the insert based on the three-dimensional locations of features of the two-dimensional pattern on the optical target and the fixed position of the optical target relative to the centerline of the insert.

According to a second embodiment, a hole location target includes a self-centering insert having a centerline and an optical target attached to the self-centering insert at a fixed position relative to the centerline of the self-centering insert. The optical target includes a light-emitting display. The light-emitting display includes a two-dimensional pattern thereon.

According to the second embodiment, a hole location measurement system includes a hole location target, a camera system, and a computer system. The hole location target includes a self-centering insert having a centerline and an optical target attached to the self-centering insert at a fixed position relative to the centerline of the self-centering insert. The optical target includes a light-emitting display having a two-dimensional pattern thereon. The camera system is configured to capture images of the two-dimensional pattern of the optical target. The computer system is configured to control modification of the two-dimensional pattern of the optical target and to determine three-dimensional coordinates of the centerline of the self-centering insert from the images of the two-dimensional pattern of the optical target.

According to the second embodiment, a method for measuring a location of a hole includes centering an insert within a hole having a centerline. An optical target is attached to the insert at a fixed position relative to the centerline of the insert. The optical target includes a light-emitting display having a two-dimensional pattern thereon. The method further includes capturing images of the two-dimensional pattern of the optical target, modifying the two-dimensional pattern of the optical target; and capturing images of the modified two-dimensional pattern of the optical target.

According to a third embodiment, a hole location target includes a self-centering insert having a centerline and a laser beam emitter attached to the self-centering insert. The axis of the emitted laser beam is concentric to the centerline of the self-centering insert.

According to the third embodiment, a hole location measurement system includes a hole location target, an optical system, and a computer system. The hole location target includes a self-centering insert having a centerline and a laser beam emitter attached to the self-centering insert, wherein the axis of the emitted laser beam is concentric to the centerline of the self-centering insert. The optical system senses the location of the emitted laser beam at multiple distances from the laser beam emitter. The computer system is configured to determine three-dimensional coordinates of the centerline of the self-centering insert from the sensed locations of the emitted laser beam.

According to the third embodiment, a method for measuring a location of a hole includes centering an insert within a hole having a centerline and emitting a laser beam from a laser beam emitter attached to the insert. The axis of the emitted laser beam is concentric to the centerline of the insert. The method further includes sensing the location of the emitted laser beam at multiple distances from the laser beam emitter and determining three-dimensional coordinates of the centerline of the self-centering insert from the sensed locations of the emitted laser beam.

Other embodiments of the disclosed hole location targets, hole location measurement systems, and methods for measuring a location of a hole will become apparent from the following detailed description, the accompanying drawings and the appended claims.

DETAILED DESCRIPTION

FIGS. 1, 2, 3, 4A, 4B, 5, and 6 relate to hole location targets, hole location measurement systems, and methods for measuring a location of a hole according to a first embodiment of the present description. FIGS. 7, 8, 9, 10A, 10B, 11, and 12 relate to hole location targets, hole location measurement systems, and methods for measuring a location of a hole according to a second embodiment of the present description. FIGS. 13, 14, 15A, 15B, 16A, 16B and 17 relate to hole location targets, hole location measurement systems, and methods for measuring a location of a hole according to a third embodiment of the present description.

The hole location targets according to the first, second, and third embodiments each include a self-centering insert for inserting into a hole of a workpiece. It will be understood that the self-centering inserts of the first, second, and third embodiments can include any structures capable of inserting into the hole and self-centering a centerline of the self-centering insert to a respective centerline of the hole, such as a radially expandable bushing as shown in the illustrated examples.

In the illustrated examples, the hole location targets of the first and second embodiments are described below to include a radially expandable bushing in the form of expandable bellows, and the hole location target of the third embodiment is described below to include a radially expandable bushing in the form of an expandable collet. However, it will be understood that the hole location targets of the first and second embodiments can include a radially expandable bushing in the form of an expandable collet, and the hole location target of the third embodiment can include a radially expandable bushing in the form of an expandable bellows.

The hole location targets according to the first and second embodiments each include an optical target attached to the self-centering insert at a fixed position relative to the centerline of the self-centering insert. It will be understood that the optical targets of the first and second embodiments can have any shapes. In the illustrated examples, the optical target of the first embodiment are described below to include a cylindrical exterior surface, and the optical target of the second embodiment is described below to include flat rectangular surface. However, it will be understood that the optical target of the first embodiment can include a flat rectangular surface, and the optical target of the second embodiment can include a cylindrical exterior surface.

Figure 1:
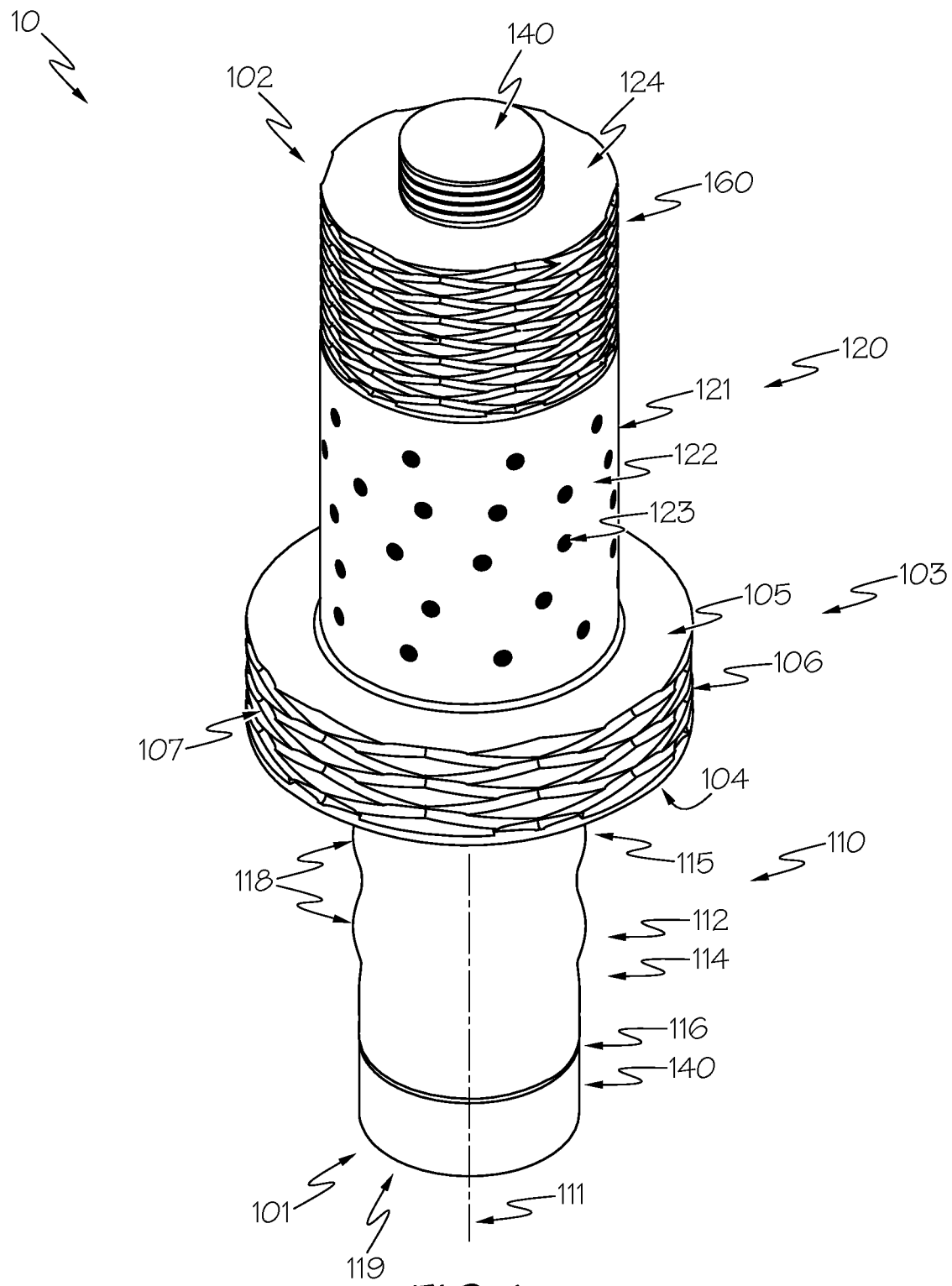
FIG. 1 is a perspective view of a first exemplary hole location target according to the first embodiment of the present description in an assembled state.
Figure 2:
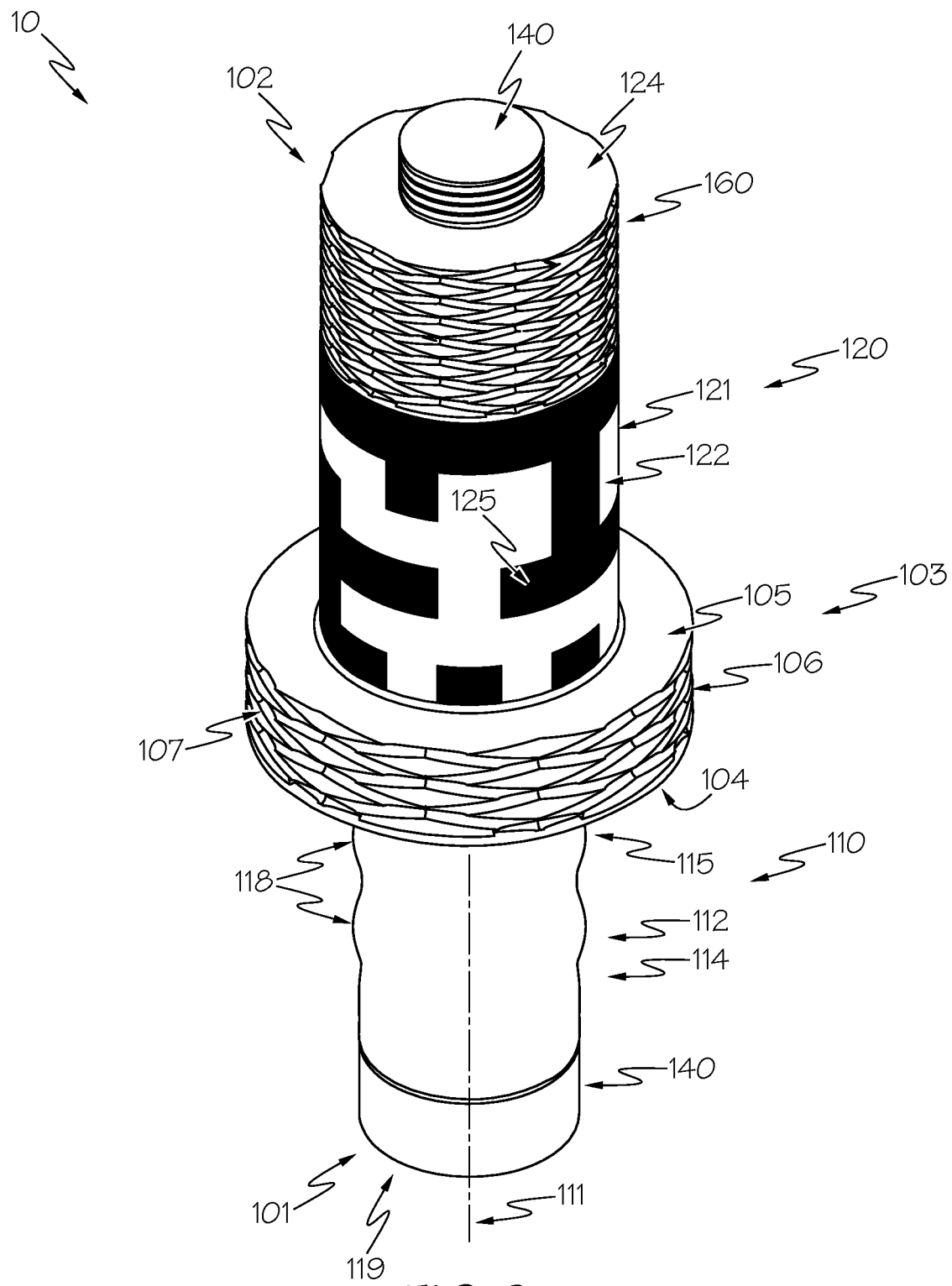
FIG. 2 is a perspective view of a second exemplary hole location target according to the first embodiment of the present description in an assembled state.
Figure 3:
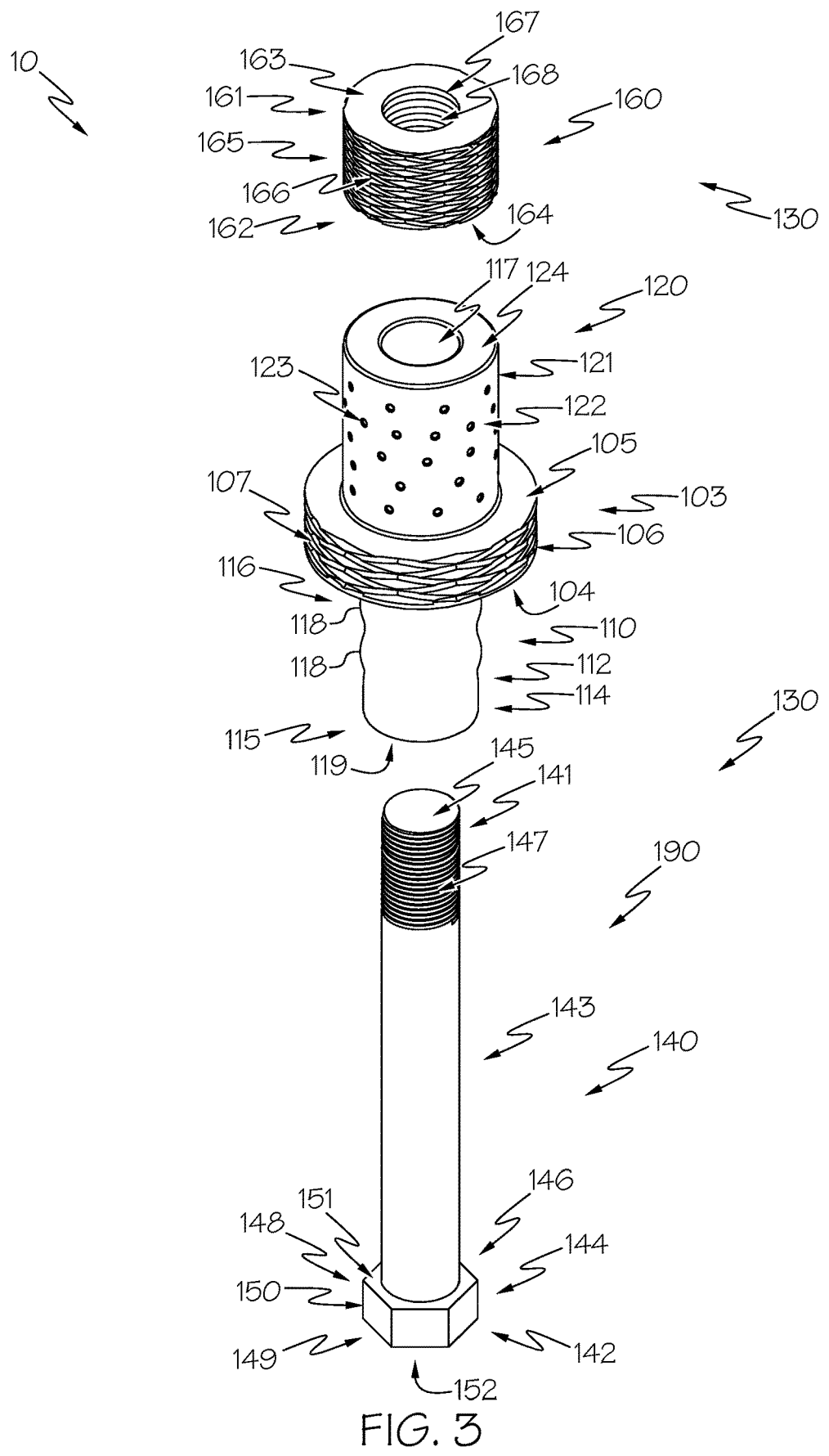
FIG. 3 is an exploded perspective view of the hole location target of FIG. 1.
Figure 4A:
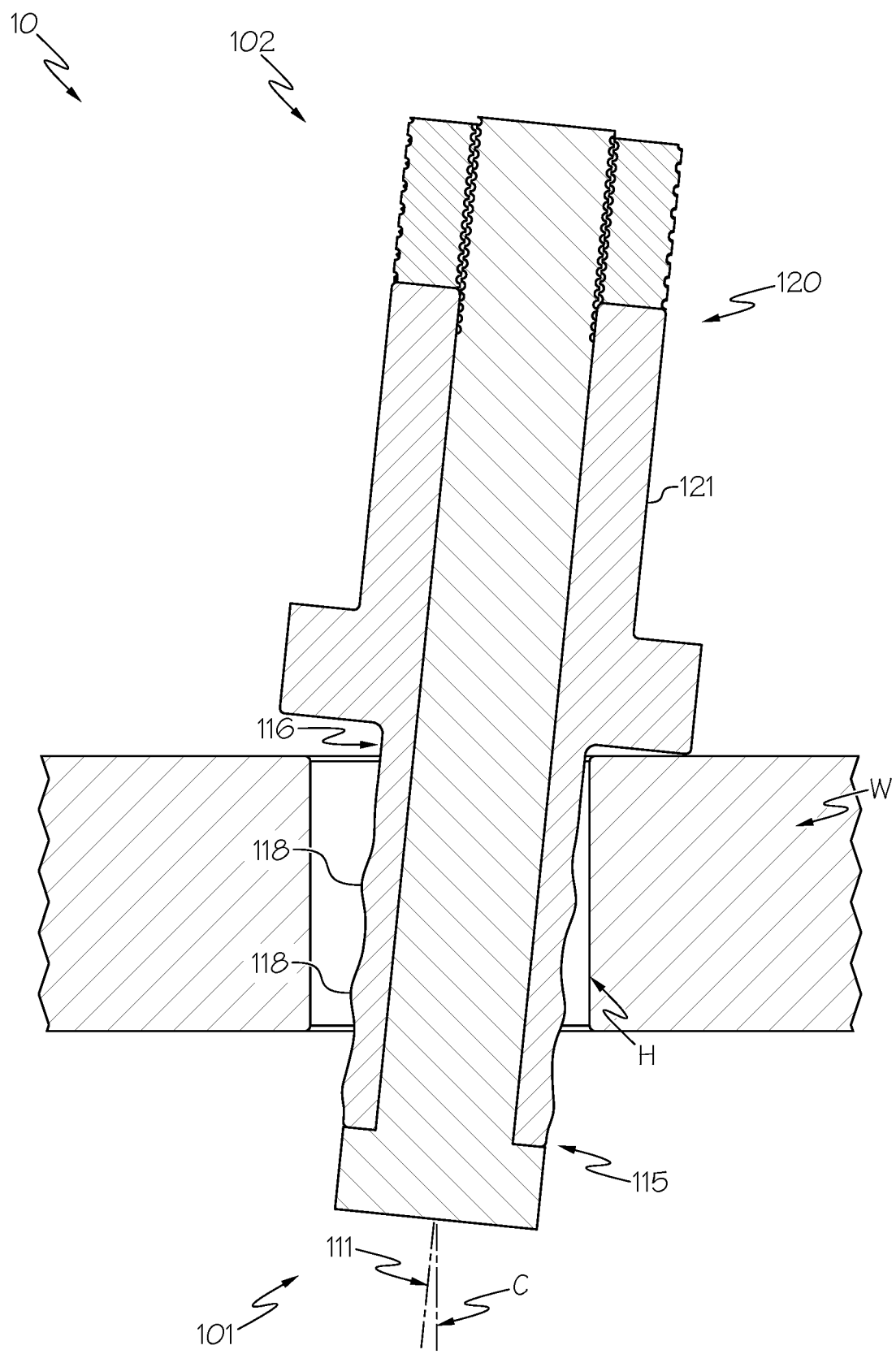
FIG. 4A is cross-sectional view of the hole location target of FIG. 1 inserted into a hole of a workpiece in a radially contracted state.
Figure 4B:
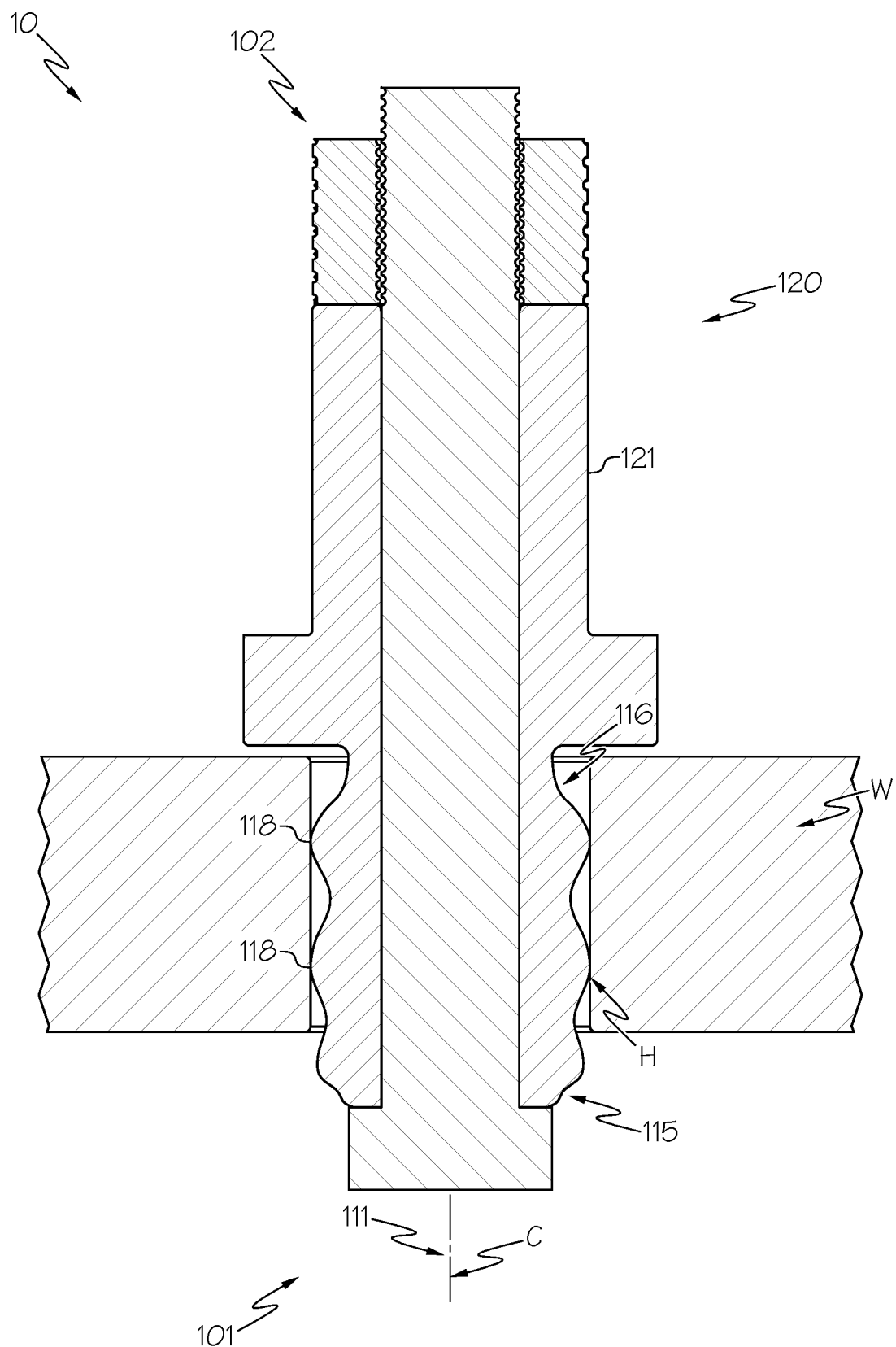
FIG. 4B is cross-sectional view of the hole location target of FIG. 4A in a radially expanded state.

FIG. 1 is a perspective view of a first exemplary hole location target according to the first embodiment of the present description in an assembled state. FIG. 2 is a perspective view of a second exemplary hole location target according to the first embodiment of the present description in an assembled state. FIG. 3 is an exploded perspective view of the hole location target of FIG. 1. FIG. 4A is cross-sectional view of the hole location target of FIG. 1 inserted into a hole of a workpiece W in a radially contracted state. FIG. 4B is cross-sectional view of the hole location target of FIG. 4A in a radially expanded state.

Referring to FIGS. 1, 2, 3, 4A, and 4B, the hole location target 10 includes a first end 101 configured to be inserted into a hole H of a workpiece W and a second end 102 opposite to the first end 101.

The hole location target 10 includes a self-centering insert 110 and an optical target 120 attached to the self-centering insert 110. The self-centering insert 110 is positioned near the first end 101 and the optical target 120 is positioned near the second end 102 such that the self-centering insert 110 can be inserted into the hole H of the workpiece and the optical target 120 can remain outside of the hole H of the workpiece W.

The self-centering insert 110 has a centerline 111 and the optical target 120 is at a fixed position relative to the centerline 111 of the self-centering insert 110.

The self-centering insert 110 is configured to be inserted into the hole H of the workpiece W and to be self-centered such that the centerline 111 of the self-centering insert 110 is positioned coaxially with a respective centerline C of the hole H of the workpiece W. By centering the centerline 111 of the self-centering insert 110 to be coaxial with the centerline C of the hole H of the workpiece W, a method that measures a location of the centerline 111 of the self-centering insert 110 can be employed to determine a location of the centerline C of the hole H of the workpiece W. Furthermore, by making the optical target 120 to be at a fixed position relative to the centerline 111 of the self-centering insert 110, a method that measures a location of the optical target 120 can be employed to determine the location of the centerline 111 of the self-centering insert 110 and, thus, to determine the location of the centerline C of the hole H of the workpiece W.

In an aspect, the optical target 120 has a cylindrical exterior surface 121 that is concentric to the centerline 111 of the self-centering insert 110. By making the cylindrical exterior surface 121 to be concentric to the centerline 111 of the self-centering insert 110, a method that measures a location of the cylindrical exterior surface 121 can be employed to determine the location of the centerline 111 of the self-centering insert 110 and, thus, to determine the location of the centerline C of the hole H of the workpiece W.

In the illustrated example, the self-centering insert 110 of the first embodiment includes a radially expandable bushing 112. It will be understood that the radially expandable bushing 112 can include any tubular structure capable of inserting into the hole H of the workpiece W and capable of radially expanding to self-center the centerline 111 of the self-centering insert 110 to the centerline C of the hole H of the workpiece W. In the illustrated example, the radially expandable bushing 112 takes the form of an expandable bellows 114. In an alternative example, the radially expandable bushing 112 can take the form of an expandable collet such as is described below with respect to the third embodiment.

The expandable bellows 114 of the present description is a tubular structure in which an axial contraction of the expandable bellows 114 translates into a radial expansion of expandable bellows 114 and an axial expansion of the expandable bellows 114 translates into a radial contraction of expandable bellows 114. In the illustrated example, the expandable bellows 114 includes a first bellows end 115 and a second bellows end 116 and one or more radial ridges 118 between the first bellows end 115 and the second bellows end 116. By axially contracting the expandable bellows 114, the one or more radial ridges 118 expand radially. By axially expanding the expandable bellows 114, the one or more radial ridges 118 contract radially.

As shown in FIG. 4A, by axially expanding the expandable bellows 114, the one or more radial ridges 118 contract radially, thereby permitting the expandable bellows 114 to be inserted into a hole H of a workpiece W. As shown in FIG. 4B, after inserting the expandable bellows into the hole H of the workpiece W, the expandable bellows 114 can be axially contracted to radially expand one or more radial ridges 118. The one or more radial ridges 118 then contact the walls defining the hole H of the workpiece W, thus causing a self-centering of the centerline 111 of the expandable bellows 114 to the respective centerline C of the hole H of the workpiece W.

In the illustrated example, the optical target 120 is attached to the self-centering insert 110 such that the cylindrical exterior surface 121 is concentric to the centerline 111 of the self-centering insert 110. By way of example, the optical target 120 can be fixedly positioned to the self-centering insert 110 such that a position of the optical target is fixed with respect to a position of centerline 111 of the self-centering insert 110. The positioning of the optical target 120 with respect to the position of centerline 111 of the self-centering insert 110 can be permanent. In an example, the self-centering insert 110 and the optical target 120 can be combined as a monolithic body. For improved precision, the self-centering insert 110 and the optical target 120 can be unitary formed together as a monolithic body by one or more processes, such as casting, molding, and additive manufacturing. In an aspect, the cylindrical exterior surface 121 of the optical target 120 has a surface cylindricity of 5 μm or less (or a tolerance of concentricity of the cylindrical surface to the centerline that is within 5 μm) for improved precision of determining the centerline C of the hole H of the workpiece W.

In the illustrated example, the self-centering insert 110 includes a bore 117 for accommodating a compression device 130. The compression device 130 is configured to axially contract the expandable bellows 114. In the illustrated example, the compression device 130 includes a bolt 140 and a nut 160.

As shown, the bolt 140 has a first bolt end 141 and a second bolt end 142. The bolt 140 includes a bolt shaft 143 positioned at the first bolt end 141 of the bolt 140 and a bolt head 144 positioned at the second bolt end 142 of the bolt 140. The bolt shaft 143 includes a first shaft end 145 and a second shaft end 146. Exterior threads 147 are positioned at the first shaft end 145 of the bolt shaft 143, and the bolt head 144 is joined to the second shaft end 146. The bolt head 144 includes a first bolt head end 148 and a second bolt head end 149. A first bolt face 151 is positioned at the first bolt head end 148, a second bolt face 152 is positioned at the second bolt head end 149, and an outer bolt head surface 150 is positioned between the first bolt head end 148 and the second bolt head end 149. The outer bolt head surface 150 can take the form of a plurality of faces extending around a circumference of the bolt head 144 to improve retention of the bolt 140 within the bore 117 of the self-centering insert 110.

As shown, the nut 160 has a first nut end 161 and a second nut end 162. A first nut face 163 is positioned at the first nut end 161, a second nut face 164 is positioned at the second nut end 162, and an outer nut surface 165 is positioned between the first nut end 161 and the second nut end 162. In an aspect, the outer nut surface 165 can include a nut gripping surface 166 configured to improve a grip of the nut 160. As shown, the nut gripping surface 166 can take the form of a knurled surface for manually torqueing of the nut 160. Alternatively, the nut gripping surface 166 can take other forms, such as the of a plurality of faces for torqueing the nut 160 with a tool. The nut bore 167 passes through the nut 160 from the first nut face 163 to the second nut face 164, and the nut bore 167 includes interior threads 168 configured to engage with the exterior threads 147 of the bolt 140.

As shown, the bolt shaft 143 passes through bore 117 at a bellows end surface 119 at the first end 101 of the self-centering insert 110 to target end surface 124 at the second end 102 of the optical target 120, and the exterior threads 147 of the bolt 140 engage with the interior threads 168 of the nut 160. The first nut face 163 engages with the optical target 120, and the first bolt face 151 engages with the first bellows end 115 of the expandable bellows 114. Thus, the bolt 140 and nut 160 form a compression device 130 configured to contract the expandable bellows 114 by turning the nut 160. However, the compression device 130 is not limited to the above-described example. In another example, the position of the bolt 140 and nut 160 can be reversed. In yet another example, the compression device 130 may take the form of a rachet or any other compression device configured to axially contract the expandable bellows 114.

In the illustrated example, the hole location target 10 includes a collar 103. The collar 103 includes a first collar end surface 104, a second collar end surface 105, and an outer collar surface 106 positioned between the first collar end surface 104 and a second collar end surface 105. In an aspect, the outer collar surface 106 can include a collar gripping surface 107 configured to improve a grip of the collar 103. As shown, the collar gripping surface 107 can take the form of a knurled surface for manually torqueing of the collar 103. Alternatively, the collar gripping surface 107 can take other forms, such as the of a plurality of faces for torqueing the collar 103 with a tool.

The optical target 120 includes a two-dimensional pattern thereon 122. In one example, the two-dimensional pattern thereon 122 can be a plurality of a pattern of dots 123 disposed around the cylindrical exterior surface 121 of the optical target 120. In an aspect, the pattern of dots 123 can be unique such that the pattern of dots 123 on an optical target 120 of a hole location target 10 is different from the pattern of dots 123 on an optical target 120 of another hole location target 10. In another example, the two-dimensional pattern thereon 122 can be a plurality of a two-dimensional barcodes 125 disposed around the cylindrical exterior surface 121 of the optical target 120. In an aspect, the two-dimensional barcode 125 can be unique such that the two-dimensional barcode 125 on an optical target 120 of a hole location target 10 is different from the two-dimensional barcode 125 on an optical target 120 of another hole location target 10.

In an aspect, the two-dimensional pattern 122 can have a predetermined calibration with respect to the centerline 111 of the self-centering insert 110, such as a predetermined six degree of freedom calibration with respect to the centerline 111 of the self-centering insert 110. The predetermined calibration of the two-dimensional pattern 122 can be used to precisely determine the centerline 111 of the self-centering insert 110 based on a determined position of the two-dimensional pattern 122.

In an example, the two-dimensional pattern 122 includes a retroreflective material. By way of including a retroreflective material in the two-dimensional pattern 122, images of the two-dimensional pattern 122 may be captured by emitting light to the retroreflective material of the two-dimensional pattern 122 on the cylindrical exterior surface 121 of the optical target 120 and capturing light reflected by the retroreflective material.

Figure 5:
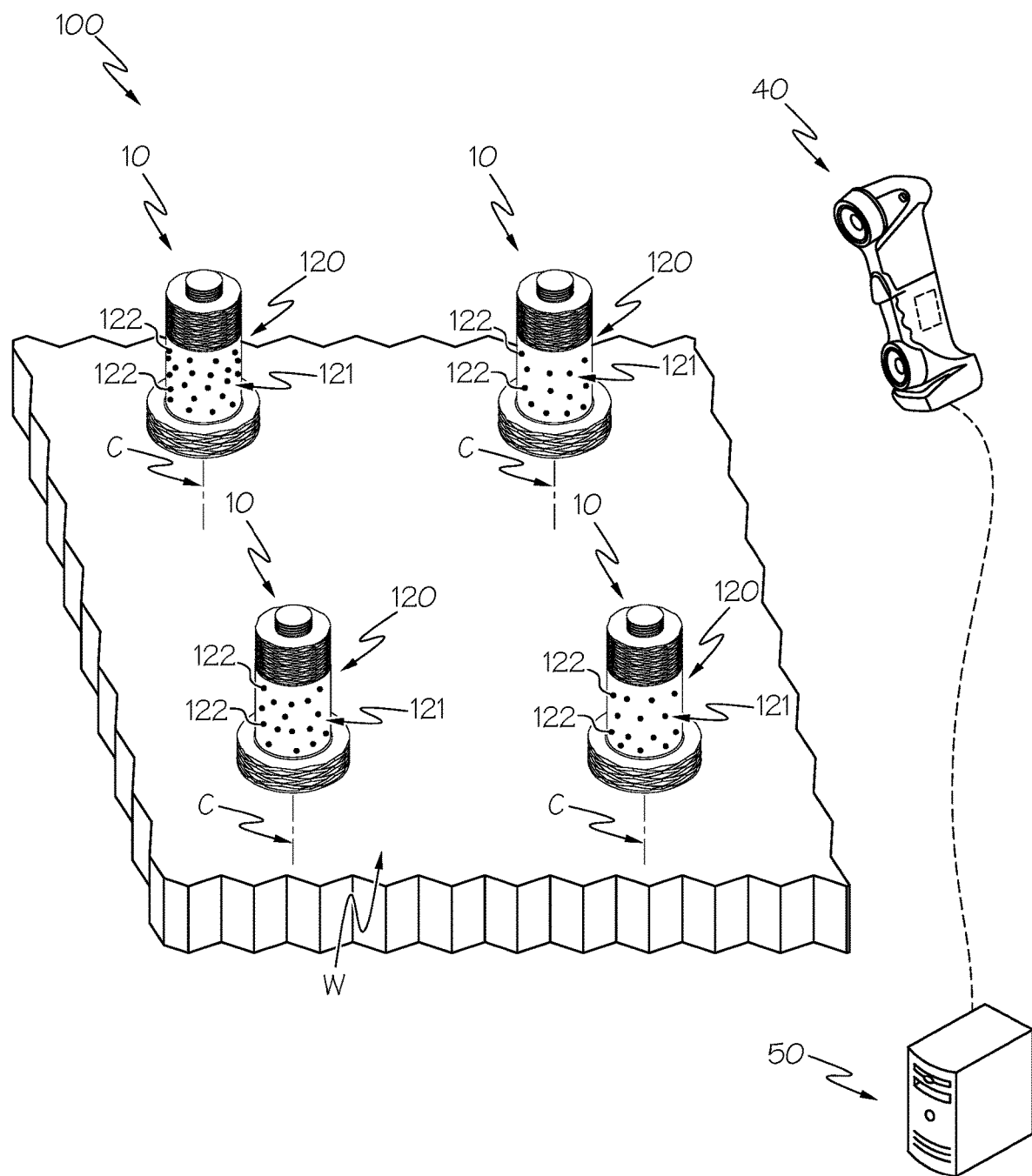
FIG. 5 is a representation of an exemplary hole location measurement system according to the first embodiment of the present description.

FIG. 5 is a representation of an exemplary hole location measurement system according to the first embodiment of the present description.

The hole location measurement system 100 of the first embodiment of the present description includes the hole location target 10 as described above, a camera system 40, and a computer system 50 in communication with the camera system 40. As shown, the camera system 40 is configured to capture images of the two-dimensional pattern 122 on the optical target 120. As shown, the computer system 50 is configured to measure three-dimensional locations of features of the two-dimensional pattern 122 on the optical target 120 and to extract a location of a cylinder axis of the cylinder surface geometry. In an aspect, the computer system is configured to measure three-dimensional locations of features of the two-dimensional pattern on a cylindrical exterior surface of the optical target, to fit the three-dimensional locations of the features of the two-dimensional pattern to a cylinder surface geometry, and to extract a location of a cylinder axis of the cylinder surface geometry. The computer system 50 may be separate from or integrated with the camera system 40.

In an aspect, hole location measurement system 100 includes a plurality of the hole location targets 10. In another aspect, the camera system 40 is configured to capture images of the two-dimensional patterns 122 of the plurality of the hole location targets 10. In yet another aspect, a single image captured by the camera system 40 includes the two-dimensional patterns 122 of the plurality of the hole location targets 10. Thus, by capturing the two-dimensional patterns 122 of the plurality of the hole location targets 10 in a single image, the hole location measurement system 100 enables for single camera, single shot measurements of multiple holes at the same time.

In an aspect, the camera system 40 is a three-dimensional optical scanner. In another aspect, the camera system is a portable three-dimensional optical scanner. Alternatively, the three-dimensional optical scanner may be of a type supported on an articulating arm.

As illustrated, the portable three-dimensional optical scanner is shown as a stereo camera-styled scanner, having a pair of spaced lenses configured to acquire real-time data from a plurality of poses, utilizing a grid style coordinate system to generate and transfer 3-D images.

In yet another aspect, the portable three-dimensional optical scanner includes an inertial navigation system. The inertial navigation system contained within the portable three-dimensional optical scanner provides a fixed point of reference, relative to an X-Y-Z set of common coordinates on which each scanned pose is based, irrespective of operator positioning of the physical scanner device. Thus, the angle and timing of each pose, i.e. orientation of the scanner in space and time relative to the target, is assured via the inertial navigation system to have a common frame of reference.

Figure 6:
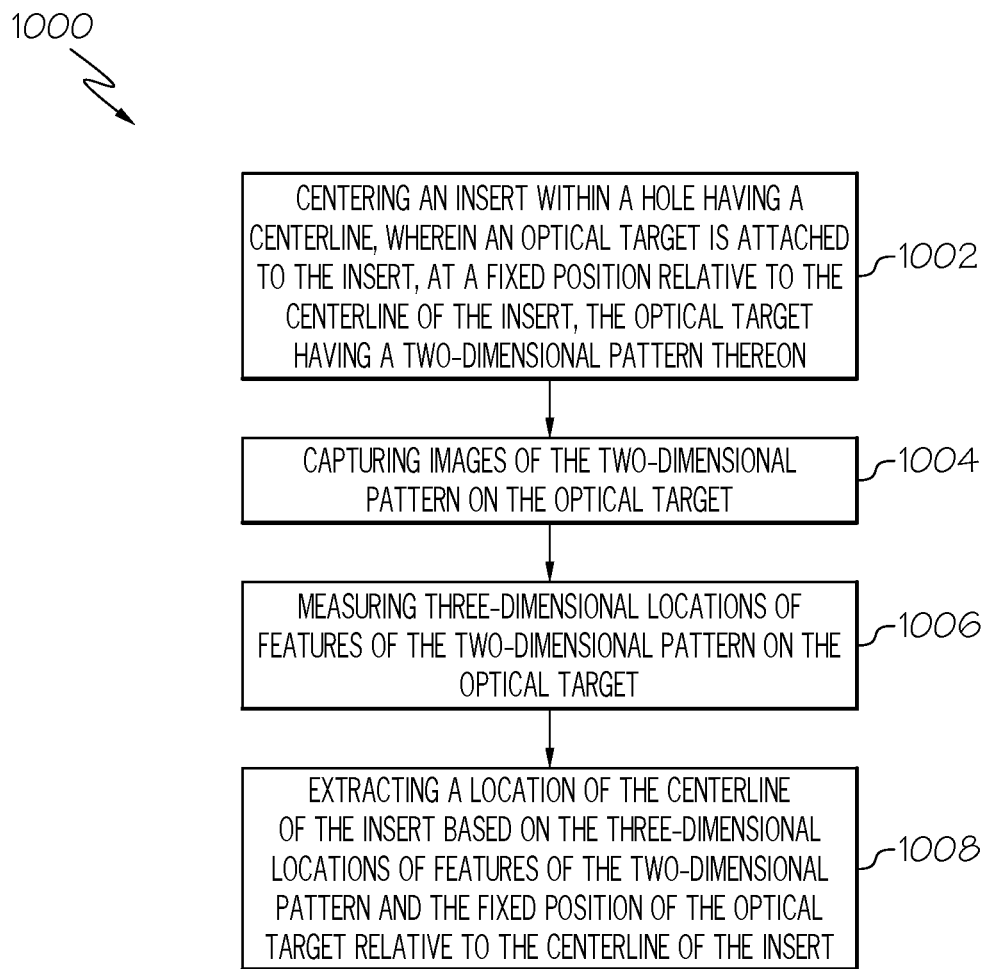
FIG. 6 is a flow diagram of an exemplary method for measuring a location of a hole of a workpiece according to the first embodiment of the present description.

FIG. 6 is a flow diagram of an exemplary method for measuring a location of a hole H of a workpiece W according to the first embodiment of the present description.

The method 1000 includes, at block 1002, centering an insert within a hole H having a centerline C. The insert can be the self-centered insert 110 or can be a different insert that is centered by any external means.

An optical target 120 is attached to the insert at a fixed position relative to the centerline 111 of the self-centering insert 110. The optical target 120 includes a two-dimensional pattern 122 thereon.

The method 1000 further includes, at block 1004, capturing images of the two-dimensional pattern 122 on the optical target 120. The images can be captured by the camera system 40 as described above. In an aspect, the step of capturing images, at block 1004, includes emitting light to a retroreflective material of the two-dimensional pattern 122 on the optical target 120 and capturing light reflected by the retroreflective material.

The method 1000 further includes, at block 1006, measuring three-dimensional locations of features of the two-dimensional pattern 122 on the optical target 120, at block 1008, extracting a location of the centerline 111 of the self-centering insert 110 based on the three-dimensional locations of features of the two-dimensional pattern 122 and the fixed position of the optical target 120 relative to the centerline 111 of the self-centering insert 110. Each of these steps can be performed by the camera system 40, the computer system 50, or the camera system 40 integrated with the computer system 50.

The step 1006 of measuring three-dimensional locations of features of the two-dimensional pattern 122 on the optical target 120 is performed by analysis of the of the images captured by the camera system 40, to identify the two dimensional pattern of the optical target within the acquired image and to determine distance relative to the optical target based on a measure of target features within the image.

In an example, measuring three-dimensional locations of features of the two-dimensional pattern 122 on the optical target 120 includes measuring three-dimensional locations of dot centroids of a pattern of dots 123 of the two-dimensional pattern 122 shown in FIG. 1. Each dot of the pattern of dots 123 has a centroid which can be determined from the images captured by the camera system 40, and each centroid has a specific three-dimensional location. Thus, by measuring the three-dimensional locations of each dot centroid as captured by the camera system 40, a plurality of precise three-dimensional locations on the optical target 120 can be found.

In another example, measuring three-dimensional locations of features of the two-dimensional pattern 122 on the optical target 120 includes measuring three-dimensional locations of intersections of a two-dimensional barcode 125 of the two-dimensional pattern 122 shown in FIG. 2. Each line of the two-dimensional barcode 125 defines a one-dimensional vector in three-dimensional space, which can be determined from the images captured by the camera system 40, and the intersection of two lines of the two-dimensional barcode 125 defines a specific three-dimensional location. Thus, by measuring the three-dimensional locations of intersections of a barcode pattern as captured by the camera system 40, a plurality of precise three-dimensional locations on the optical target 120 can be found.

The step 1008 of fitting the three-dimensional locations of the features of the two-dimensional pattern 122 to a cylinder surface geometry can be performed by, for example, calculating a best fit of the three-dimensional locations of the features to a cylinder surface geometry. Thus, the plurality of precise three-dimensional locations on the optical target 120 can be used to accurately find a cylinder surface geometry of the optical target 120.

The step 1010 of extracting a location of a cylinder axis of the cylinder surface geometry can be performed by, for example, calculating a best fit of a cylinder axis to the cylinder surface geometry. By extracting the location of the cylinder axis, the extracted cylinder location of the cylinder axis can be precisely equated to a centerline of the hole H of the workpiece W.

In an aspect, the method 1000 further includes comparing the three-dimensional locations of features of the two-dimensional pattern 122 on the optical target 120 to a database of three-dimensional locations of features of known optical targets. As shown in FIG. 5, the two-dimensional pattern 122 on the optical target 120 can be unique. Thus, the method 1000 can correlate a unique optical target 120 to a unique location of the hole H of the workpiece W.

Figure 7:
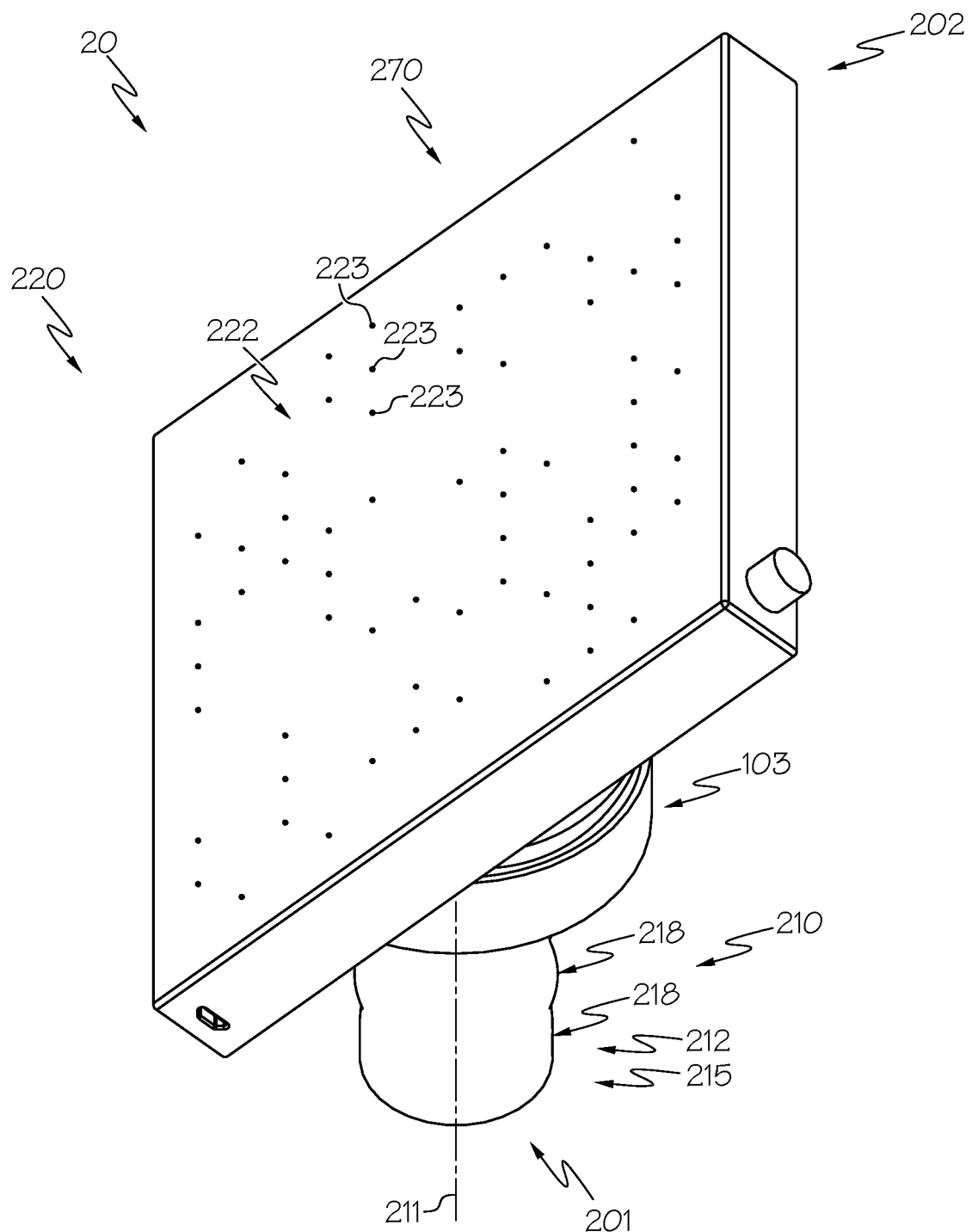
FIG. 7 is a perspective view of a first exemplary hole location target according to a second embodiment of the present description in an assembled state.
Figure 8:
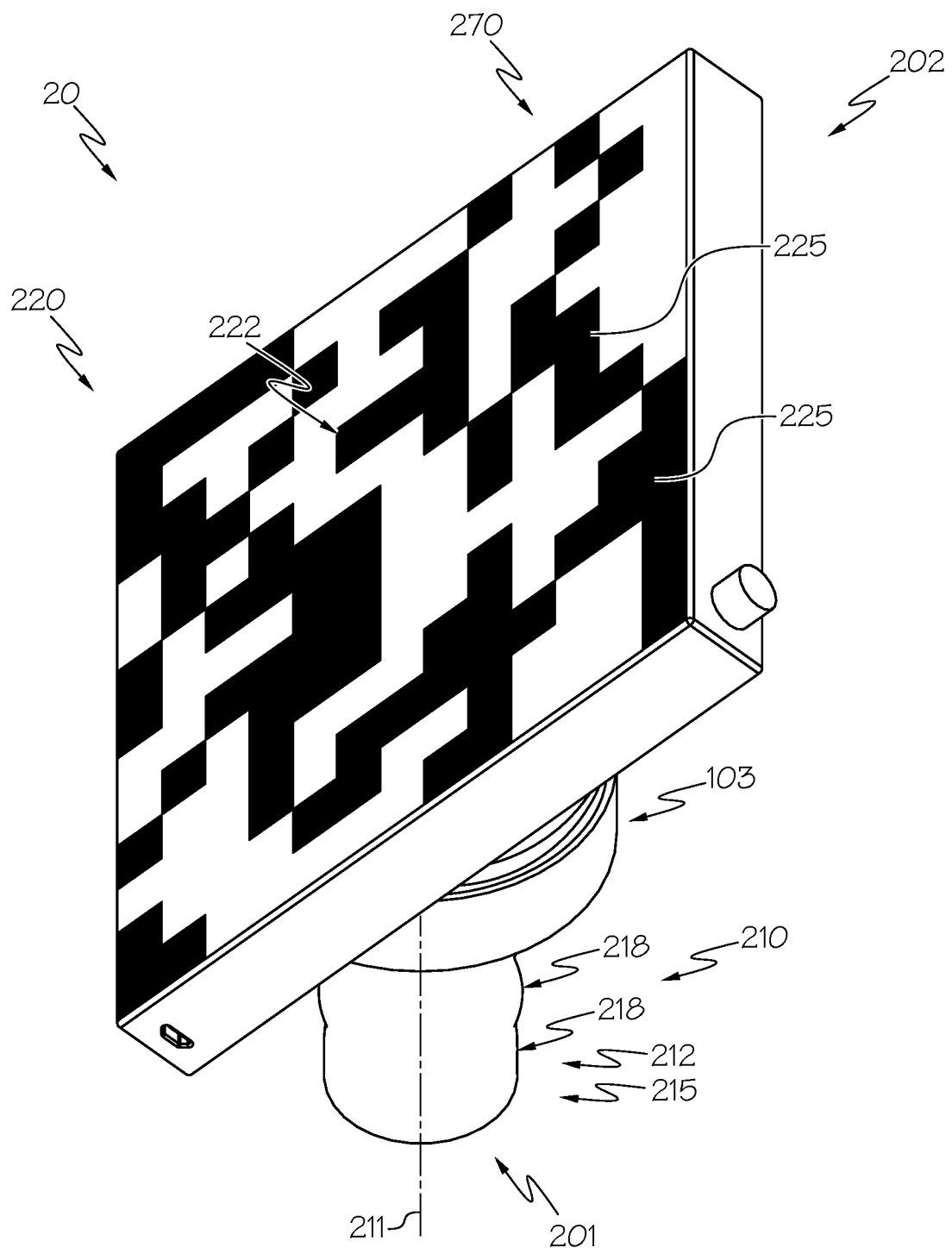
FIG. 8 is a perspective view of a second exemplary hole location target according to the second embodiment of the present description in an assembled state.
Figure 9:
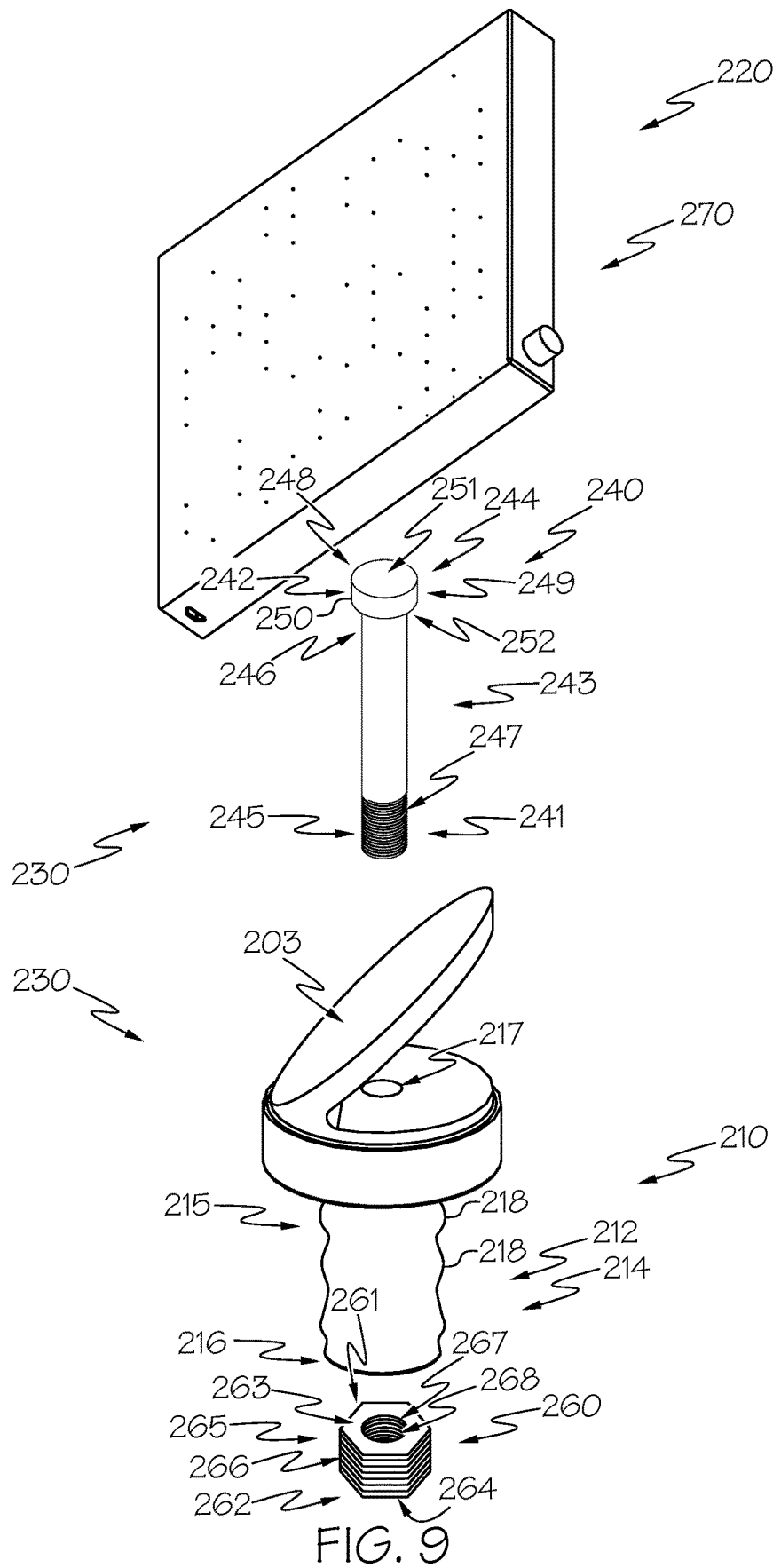
FIG. 9 is an exploded perspective view of the hole location target of FIG. 7.
Figure 10A:
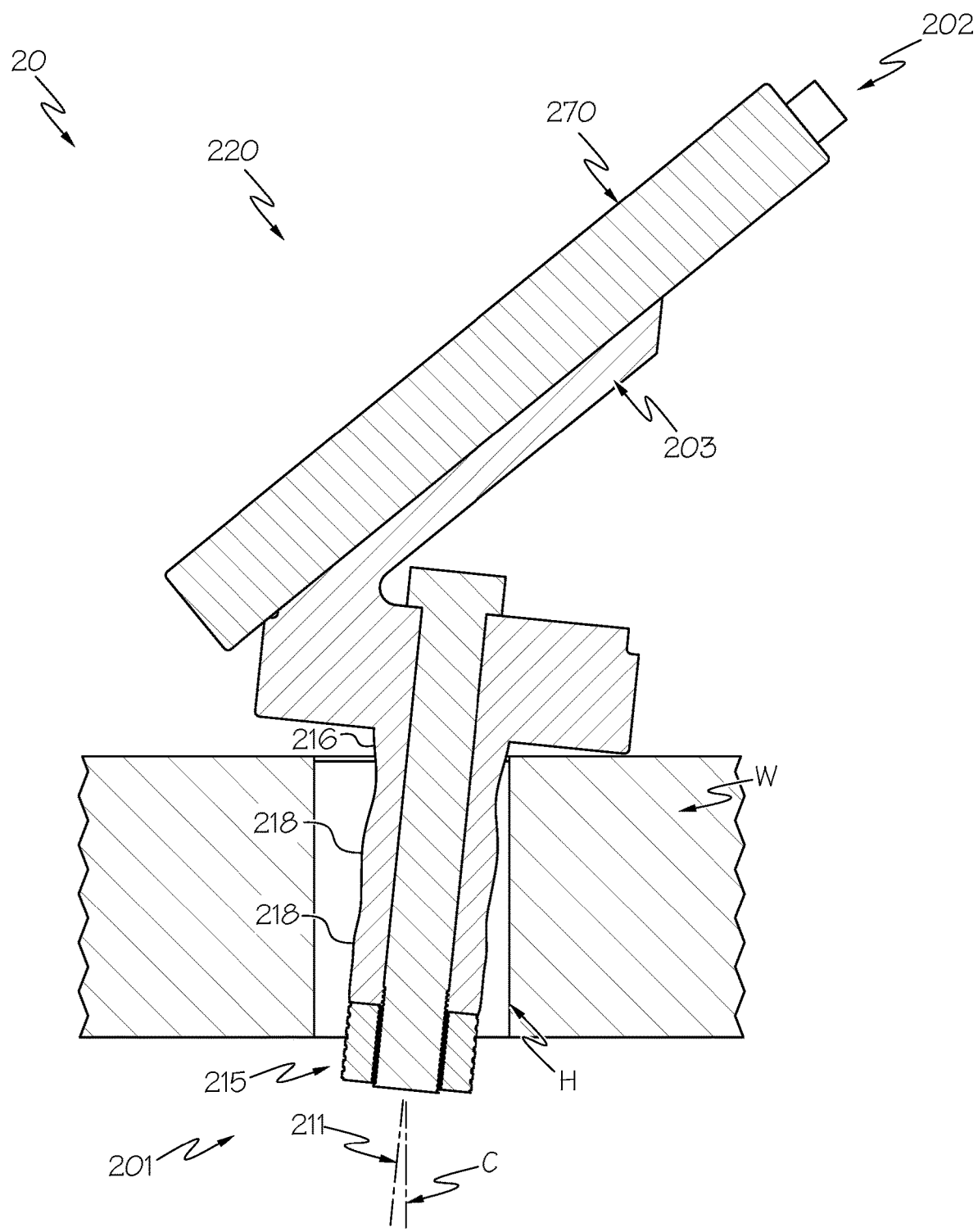
FIG. 10A is cross-sectional view of the hole location target of FIG. 7 inserted into a hole of a workpiece in a radially contracted state.
Figure 10B:
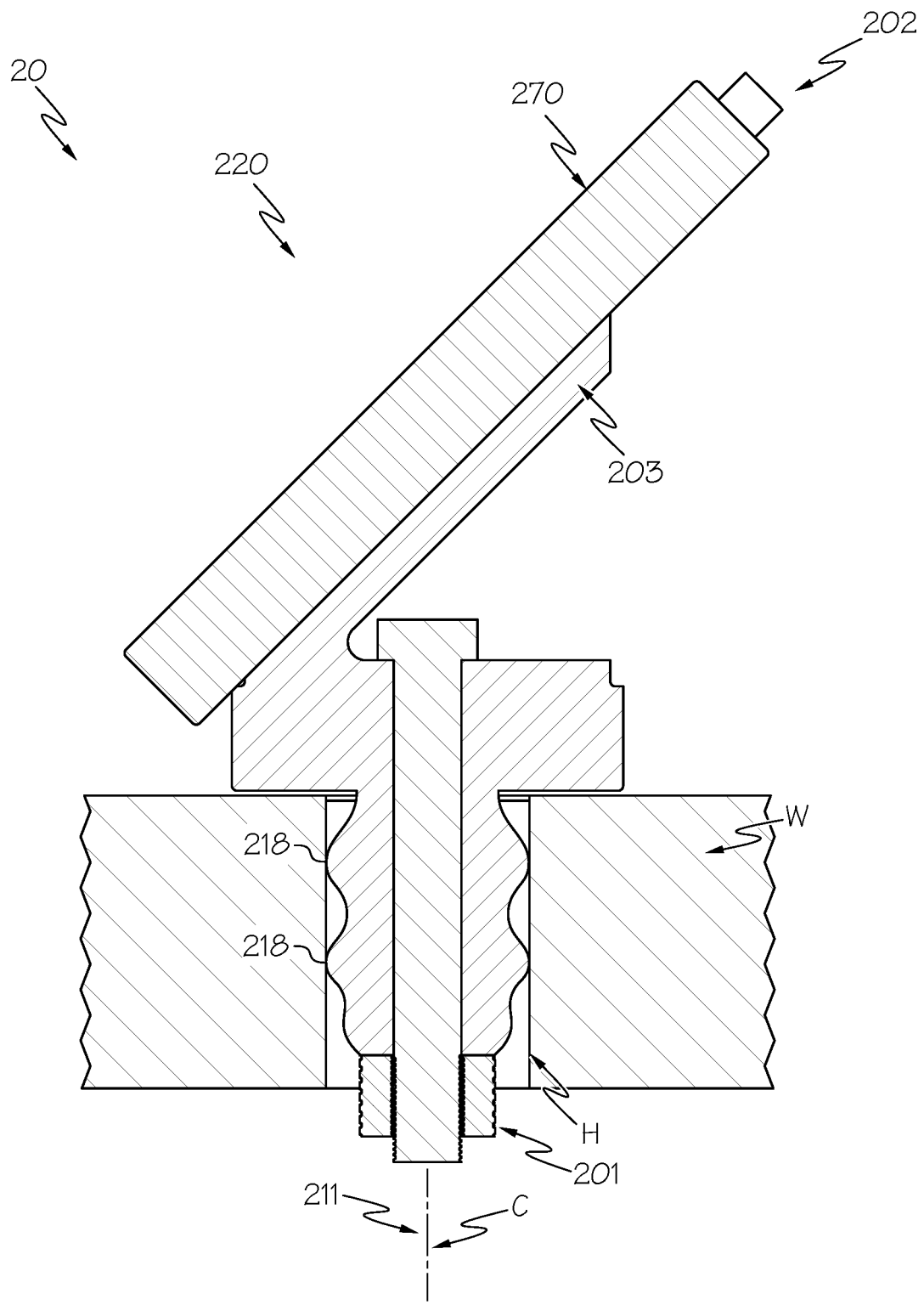
FIG. 10B is cross-sectional view of the hole location target of FIG. 10A in a radially expanded state.

FIG. 7 is a perspective view of a first exemplary hole location target according to a second embodiment of the present description in an assembled state. FIG. 8 is a perspective view of a second exemplary hole location target according to the second embodiment of the present description in an assembled state. FIG. 9 is an exploded perspective view of the hole location target of FIG. 7. FIG. 10A is cross-sectional view of the hole location target of FIG. 7 inserted into a hole of a workpiece W in a radially contracted state. FIG. 10B is cross-sectional view of the hole location target of FIG. 10A in a radially expanded state.

Referring to FIGS. 7, 8, 9, 10A, 10B, 11, and 12, the hole location target 20 includes a first end 201 configured to be inserted into a hole H of a workpiece W and a second end 202 opposite to the first end 201.

The hole location target 20 includes a self-centering insert 210 and an optical target 220 attached to the self-centering insert 210. The self-centering insert 210 is positioned near the first end 201 and the optical target 220 is positioned near the second end 202 such that the self-centering insert 210 can be inserted into the hole H of the workpiece and the optical target 220 can remain outside of the hole H of the workpiece W.

The self-centering insert 210 has a centerline 211 and the optical target 220 is attached to the self-centering insert 210 at a fixed position relative to the centerline 211 of the self-centering insert 210, and the optical target 220 includes a light-emitting display 270. By attaching the optical target 220, including the light-emitting display 270, to the self-centering insert 210 at a fixed position relative to the centerline 211 of the self-centering insert 210, a method that measures a location of the light-emitting display 270 can be employed to determine a location of the centerline 211 of the self-centering insert 210, which can be correlated to the location of the centerline C of the hole H of the workpiece W.

The self-centering insert 210 is configured to be inserted into the hole H of the workpiece W and to be self-centered such that the centerline 211 of the self-centering insert 210 is positioned coaxially with a respective centerline C of the hole H of the workpiece W. By centering the centerline 211 of the self-centering insert 210 to be coaxial with the centerline C of the hole H of the workpiece W, a method that measures a location of the centerline 211 of the self-centering insert 210 can be employed to determine a location of the centerline C of the hole H of the workpiece W. Furthermore, by making the optical target 220 at a fixed position (or known offset) relative to the centerline 211 of the self-centering insert 210, a method that measures a location of the optical target 220 can be employed to determine the location of the centerline 211 of the self-centering insert 210 and, thus, to determine the location of the centerline C of the hole H of the workpiece W. In an aspect, the self-centering insert 210 can include a bore 217 for accommodating a compression device 230.

In the illustrated example, the self-centering insert 210 of the first embodiment includes a radially expandable bushing 212. It will be understood that the radially expandable bushing 212 can include any tubular structure capable of inserting into the hole H of the workpiece W and capable of radially expanding to self-center the centerline 211 of the self-centering insert 210 to the centerline C of the hole H of the workpiece W. In the illustrated example, the radially expandable bushing 212 takes the form of an expandable bellows 214. In an alternative example, the radially expandable bushing 212 can take the form of an expandable collet such as is illustrated with respect to the third embodiment below.

The expandable bellows 214 of the present description is a tubular structure in which an axial contraction of the expandable bellows 214 translates into a radial expansion of expandable bellows 214 and an axial expansion of the expandable bellows 214 translates into a radial contraction of expandable bellows 214. In the illustrated example, the expandable bellows 214 includes a first bellows end 215 and a second bellows end 216 and one or more radial ridges 218 between the first bellows end 215 and the second bellows end 216. By axially contracting the expandable bellows 214, the one or more radial ridges 218 expand radially. By axially expanding the expandable bellows 214, the one more radial ridges 218 contract radially.

As shown in FIG. 10A, by axially expanding the expandable bellows 214, the one or more radial ridges 218 contract radially, thereby permitting the expandable bellows 214 to be inserted into a hole H of a workpiece W. As shown in FIG. 10B, after inserting the expandable bellows 214 into the hole H of the workpiece W, the expandable bellows 214 can be axially contracted to radially expand one or more radial ridges 218. The one or more radial ridges 218 then contact the walls defining the hole H of the workpiece W, thus causing a self-centering of the centerline 211 of the expandable bellows 214 to the respective centerline C of the hole H of the workpiece W.

In the illustrated example, the optical target 220 is attached to the self-centering insert 110 such that the optical target 220 is at a fixed position relative to the centerline 211 of the self-centering insert 210. The fixed positioning of the optical target 220 with respect to the position of centerline 211 of the self-centering insert 210 can be permanent. As shown, the self-centering insert 210 and a target support 203 for supporting the optical target 220 can be combined as a monolithic body. For improved precision, the self-centering insert 210 and the target support 203 can be unitary formed together as a monolithic body by one or more processes, such as casting, molding, and additive manufacturing.

In the illustrated example, the self-centering insert 210 includes a compression device 230 configured to axially contract the expandable bellows 214. In the illustrated example, the compression device 230 includes a bolt 240 and a nut 260.

As shown, the bolt 240 has a first bolt end 241 and a second bolt end 242. The bolt 240 includes a bolt shaft 243 positioned at the first bolt end 241 of the bolt 240 and a bolt head 244 positioned at the second bolt end 242 of the bolt 240. The bolt shaft 243 includes a first shaft end 245 and a second shaft end 246. Exterior threads 247 are positioned at the first shaft end 245 of the bolt shaft 243, and the bolt head 244 is joined to the second shaft end 246. The bolt head 244 includes a first bolt head end 248 and a second bolt head end 249. A first bolt face 251 is positioned at the first bolt head end 248, a second bolt face 252 is positioned at the second bolt head end 249, and an outer bolt head surface 250 is positioned between the first bolt head end 248 and the second bolt head end 249. The outer bolt head surface 250 can take the form of a plurality of faces extending around a circumference of the bolt head 244 to improve torqueing of the bolt 240.

As shown, the nut 260 has a first nut end 261 and a second nut end 262. A first nut face 263 is positioned at the first nut end 261, a second nut face 264 is positioned at the second nut end 262, and an outer nut surface 265 is positioned between the first nut end 261 and the second nut end 262. As shown, the nut gripping surface 266 can take the form of a plurality of faces for improve retention with the self-centering insert 210. The nut bore 267 passes through the nut 260 from the first nut face 263 to the second nut face 264, and the nut bore 267 includes interior threads 268 configured to engage with the exterior threads 247 of the bolt 240.

As shown, the bolt shaft 243 passes through bore 217 at the first bellows end 215 through the expandable bellows 214 to the second bellows end 216, and the exterior threads 247 of the bolt 240 engage with the interior threads 268 of the nut 260. The bolt 240 engages with the first bellows end 215 and the nut 260 engages with the second bellows end 216. Thus, the bolt 240 and nut 260 form a compression device 230 configured to contract the expandable bellows 214 by turning the bolt 240. However, the compression device 230 is not limited to the above-described example. In another example, the position of the bolt 240 and nut 260 may be reversed. In yet another example, the compression device 230 may take the form of a rachet or any other compression device configured to axially contract the expandable bellows 214.

As previously mentioned, the optical target 220 includes a light-emitting display 270. The light-emitting display 270 includes, for example, a liquid crystal display (LCD), a light emitted diode (LED), an organic light-emitting diode (OLED), or a quantum dot light emitting diodes (QLED). The light-emitting display 270 includes a two-dimensional pattern 222 thereon. By measuring a location of the light-emitting display 270, a location of the centerline 211 of the self-centering insert 210 can be determined, which can be correlated to the location of the centerline C of the hole H of the workpiece W. In an aspect, the two-dimensional pattern 22 can have a predetermined calibration with respect to the centerline 211 of the self-centering insert 210, such as a predetermined six degree of freedom calibration with respect to the centerline 211 of the self-centering insert 210. The predetermined calibration of the two-dimensional pattern 222 can be used to precisely determine the centerline 211 of the self-centering insert 210 based on a determined position of the two-dimensional pattern 222. Furthermore, by way emitting light from the light-emitting display 270, the two-dimensional pattern 222 thereon can be more easily captured by a camera system.

In the example shown in FIG. 7, the two-dimensional pattern 222 thereon can a plurality of a pattern of dots 223. In an aspect, the pattern of dots 223 can be displayed to be unique such that the pattern of dots 223 on an optical target 220 of a hole location target 20 is different from the pattern of dots 223 displayed on an optical target 220 of another hole location target 20. The three-dimensional locations of dot centroids of the pattern of dots 223 of the two-dimensional pattern 222 can be determined. Each dot of the pattern of dots 223 has a centroid which can be determined from the images captured by a camera system, and each centroid has a specific three-dimensional location. Thus, by measuring the three-dimensional locations of each dot centroid, a plurality of precise three-dimensional locations of the light-emitting display 270 of the optical target 220 can be found.

In another example shown in FIG. 8, the two-dimensional pattern 222 thereon can a plurality of a two-dimensional barcode 225 displayed by the optical target 220. In an aspect, the two-dimensional barcode 225 can be displayed to be unique such that the two-dimensional barcode 225 on an optical target 220 of a hole location target 20 is different from the two-dimensional barcode 225 displayed on an optical target 220 of another hole location target 20. Each line of the barcode pattern defines a one-dimensional vector in three-dimensional space, which can be determined from the images captured by a camera system, and the intersection of two lines of the barcode pattern defines a specific three-dimensional location. Thus, by measuring the three-dimensional locations of intersections of a barcode pattern, a plurality of precise three-dimensional locations on the light-emitting display 270 of the optical target 220 can be found.

Furthermore, by way of including a light-emitting display 270 in the optical target 220, the optical target 220 can preferably modify the two-dimensional pattern 222 of the optical target 220. Modifying the two-dimensional pattern 222 can include, for example, changing a size of the two-dimensional pattern, modifying an intensity of light of the light-emitting display 270, modifying a wavelength of light of the light-emitting display 270, and temporal modulation of light of the light-emitting display 270.

Figure 11:
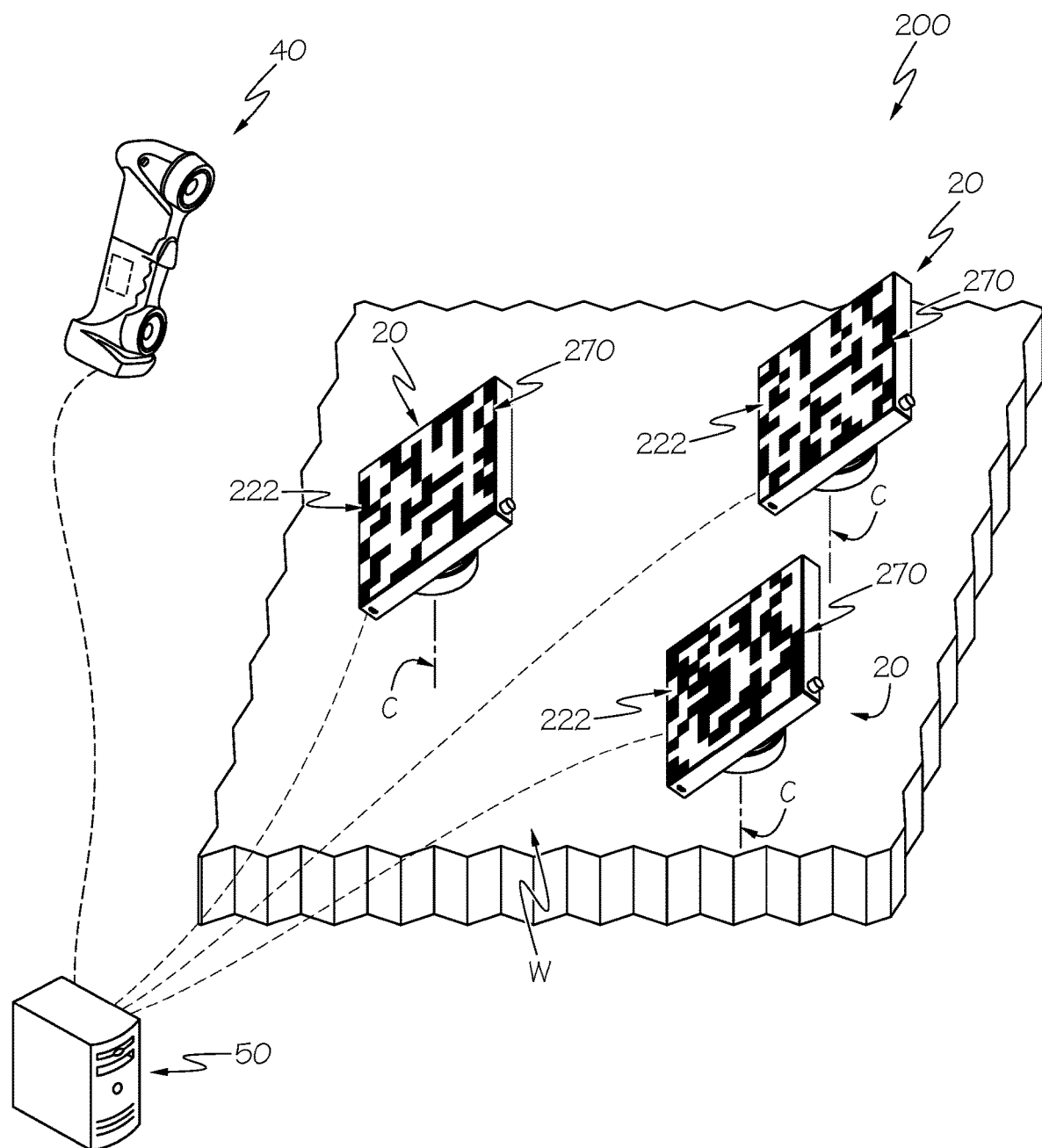
FIG. 11 is a representation of an exemplary hole location measurement system according to the second embodiment of the present description.

FIG. 11 is a representation of an exemplary hole location measurement system according to the second embodiment of the present description.

The hole location measurement system 200 includes the hole location target 20, a camera system 40 configured to capture images of the two-dimensional pattern 222 of the optical target 220, and a computer system 50 in communication with the camera system 40 and in communication with hole location target 20. The computer system 50 is configured to control modification of the two-dimensional pattern 222 of the optical target 220 and to determine three-dimensional coordinates of the centerline 211 of the self-centering insert from the images of the two-dimensional pattern 222 of the optical target 220. The computer system 50 may be separate from or integrated with the camera system 40.

In an aspect, hole location measurement system 200 includes a plurality of the hole location targets 20. In another aspect, the camera system 40 is configured to capture images of the two-dimensional patterns 222 of the plurality of the hole location targets 20. In yet another aspect, a single image captured by the camera system 40 includes the two-dimensional patterns 222 of the plurality of the hole location targets 20. Thus, by capturing the two-dimensional patterns 222 of the plurality of the hole location targets 20 in a single image, the hole location measurement system 200 enables for single camera, single shot measurements of multiple holes at the same time.

In an aspect, the camera system 40 is a three-dimensional optical scanner. In another aspect, the camera system is a portable three-dimensional optical scanner. Alternatively, the three-dimensional optical scanner may be of a type supported on an articulating arm.

As illustrated, the portable three-dimensional optical scanner is shown as a stereo camera-styled scanner, having a pair of spaced lenses configured to acquire real-time data from a plurality of poses, utilizing a grid style coordinate system to generate and transfer 3-D images.

The portable three-dimensional optical scanner can include an inertial navigation system. The inertial navigation system contained within the portable three-dimensional optical scanner provides a fixed point of reference, relative to an X-Y-Z set of common coordinates on which each scanned pose is based, irrespective of operator positioning of the physical scanner device. Thus, the angle and timing of each pose, i.e. orientation of the scanner in space and time relative to the target, is assured via the inertial navigation system to have a common frame of reference.

In an aspect, the light-emitting display 270 and the camera system 40 can include at least one of matching polarized filters and matching wavelength filters. By way of matching a polarized filter and/or a wavelength filter of the light-emitting display 270 and the camera system 40, a capability of a hole location measurement system 200 to capture images of the two-dimensional patterns 222 of the plurality of the hole location targets 20 can be enhanced.

Figure 12:
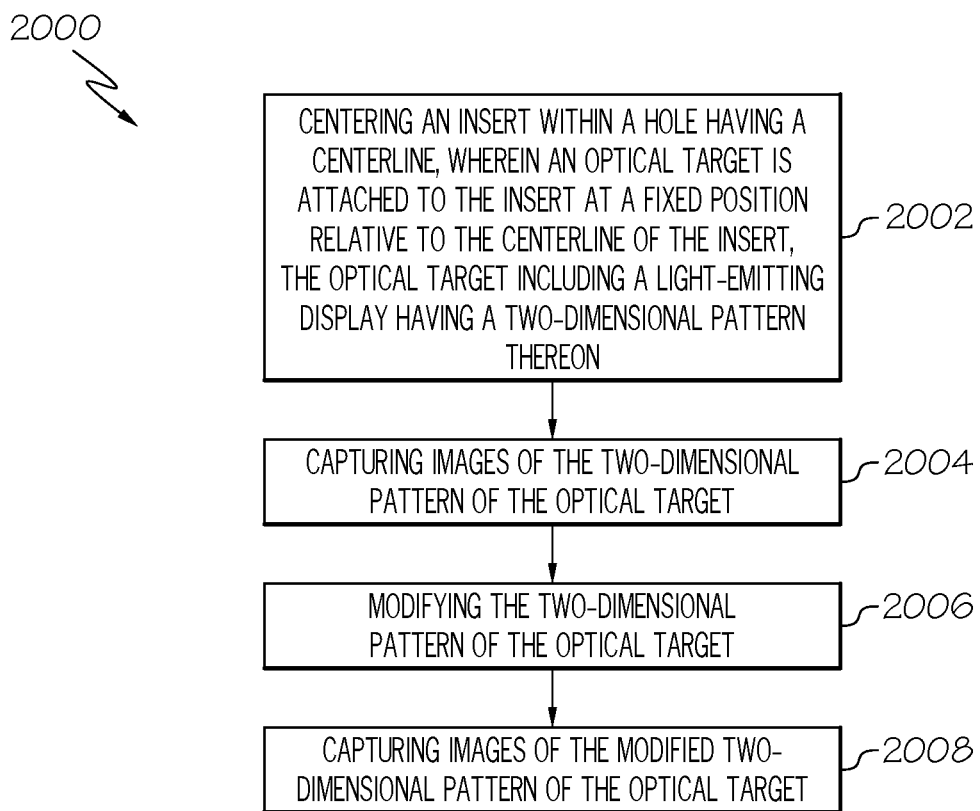
FIG. 12 is a flow diagram of an exemplary method for measuring a location of a hole of a workpiece according to the second embodiment of the present description.

FIG. 12 is a flow diagram of an exemplary method for measuring a location of a hole H of a workpiece W according to the second embodiment of the present description.

The method 2000 for measuring a location of a hole H includes, at block 2002, centering an insert within a hole having a centerline. The insert can be the self-centered insert 210 or can be a different insert that is centered by any external means. The optical target 220 is attached to the insert at a fixed position relative to the centerline 211 of the insert. The optical target 220 includes the light-emitting display 270 comprising a two-dimensional pattern 222 thereon. In an example, the two-dimensional pattern 222 can include, for example, the pattern of dots 223 or the two-dimensional barcode 225.

The method 2000 further includes, at block 2004, capturing images of the two-dimensional pattern 222 of the optical target. The images can be captured by the camera system 40 as described above.

The method 2000 further includes, at block 2006, modifying the two-dimensional pattern 222 of the optical target 220.

The method 2000 further includes, at block 2008, capturing images of the modified two-dimensional pattern 222 of the optical target 220. The images can be captured by the camera system 40 as described above.

In step 2006, modifying the two-dimensional pattern 222 can include, for example, changing a size of the two-dimensional pattern, modifying an intensity of light of the light-emitting display 270, modifying a wavelength of light of the light-emitting display 270, and temporal modulation of light of the light-emitting display 270.

Changing a size of the two-dimensional pattern 222 can include, for example, increasing or decreasing size of each dot of the pattern of dots 223 or increasing or decreasing a size of a bar of the two-dimensional barcode 225. By way of increasing or decreasing a size of the two-dimensional pattern 222, the method 2000 can compensate for a distance between the camera system 40 and the hole location target 20. In an exemplary aspect, the camera system 40, alone or by way of the computer system 50, can control a size of the two-dimensional pattern 222. Thus, the method 2000 can provide for an interactive control of the size of the two-dimensional pattern 222 based on real-time feedback from the camera system 40 capturing the images of the two-dimensional pattern 222.

By way of modifying an intensity of light of the light-emitting display 270, the method 2000 can compensate for environmental conditions, e.g. intensity of background light. In an exemplary aspect, the camera system 40, alone or by way of the computer system 50, can control an intensity of light of the two-dimensional pattern 222. Thus, the method 2000 can provide for an interactive control of the intensity of the two-dimensional pattern 222 based on real-time feedback from the camera system 40 capturing the images of the two-dimensional pattern 222.

By way of modifying a wavelength of light of the light-emitting display 270, the method 2000 can compensate for environmental conditions by distinguishing the wavelength of light emitted from the light-emitting display 270. In an exemplary aspect, the camera system 40, alone or by way of the computer system 50, can control a wavelength of light of the two-dimensional pattern 222. Thus, the method 2000 can provide for an interactive control of the wavelength of the two-dimensional pattern 222 based on real-time feedback from the camera system 40 capturing the images of the two-dimensional pattern 222.

By way of temporal modulation of light of the light-emitting display 270, the method 2000 can compensate for environmental conditions. Temporal modulation of light can include, for example, a blinking of light of the light-emitting display 270. In an exemplary aspect, the camera system 40, alone or by way of the computer system 50, can control a of temporal modulation of light of the two-dimensional pattern 222. Thus, the method 2000 can provide for an interactive control of the phase of the two-dimensional pattern 222 based on real-time feedback from the camera system 40 capturing the images of the two-dimensional pattern 222.

Thus, as described above, modifying the two-dimensional pattern 222 of the optical target 220 by the camera system 40, alone or by way of the computer system 50, can provide for method 2000 that adjusts the optical target 220 to the conditions at the time of taking the measurements.

In another aspect, modifying the two-dimensional pattern 222 of the optical target 220 can communicate a status of the hole location target 20. Thus, modifying the two-dimensional pattern 222 can communicate a signal with a status of the hole location target 20, which can include correlating the signal with an identity of the hole location target.

Figure 13:
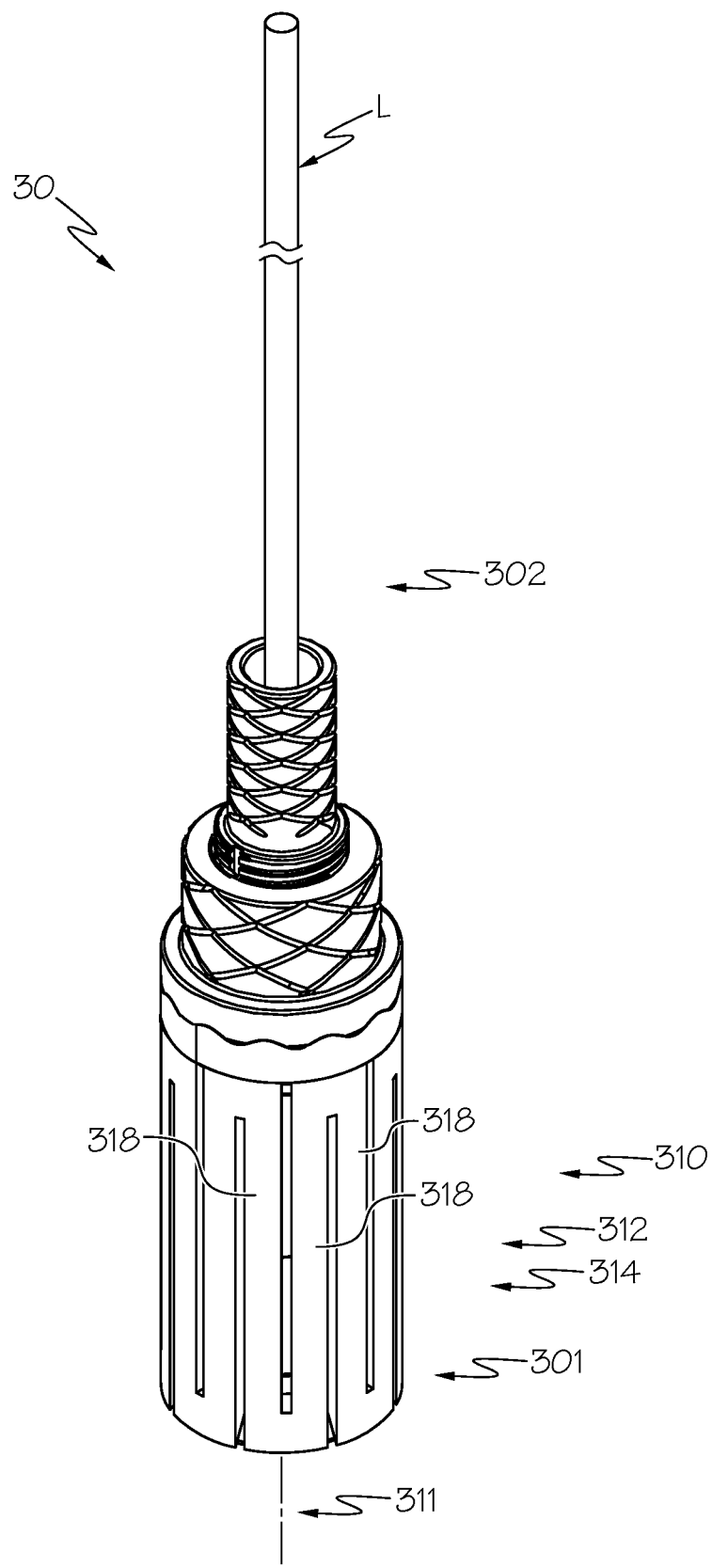
FIG. 13 is a perspective view of an exemplary hole location target according to a third embodiment of the present description in an assembled state.
Figure 14:
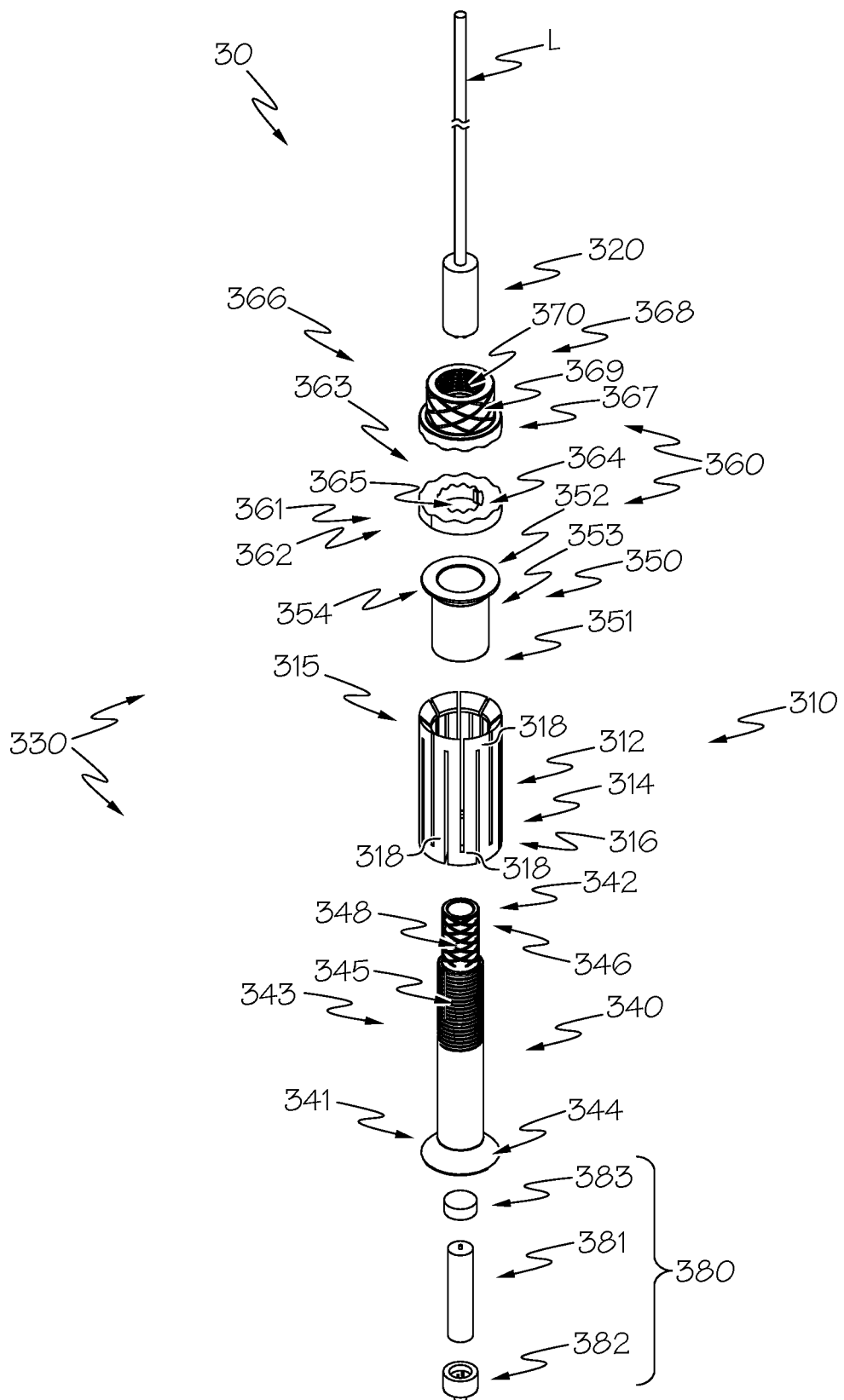
FIG. 14 is an exploded perspective view of the hole location target of FIG. 13.
Figure 15A:
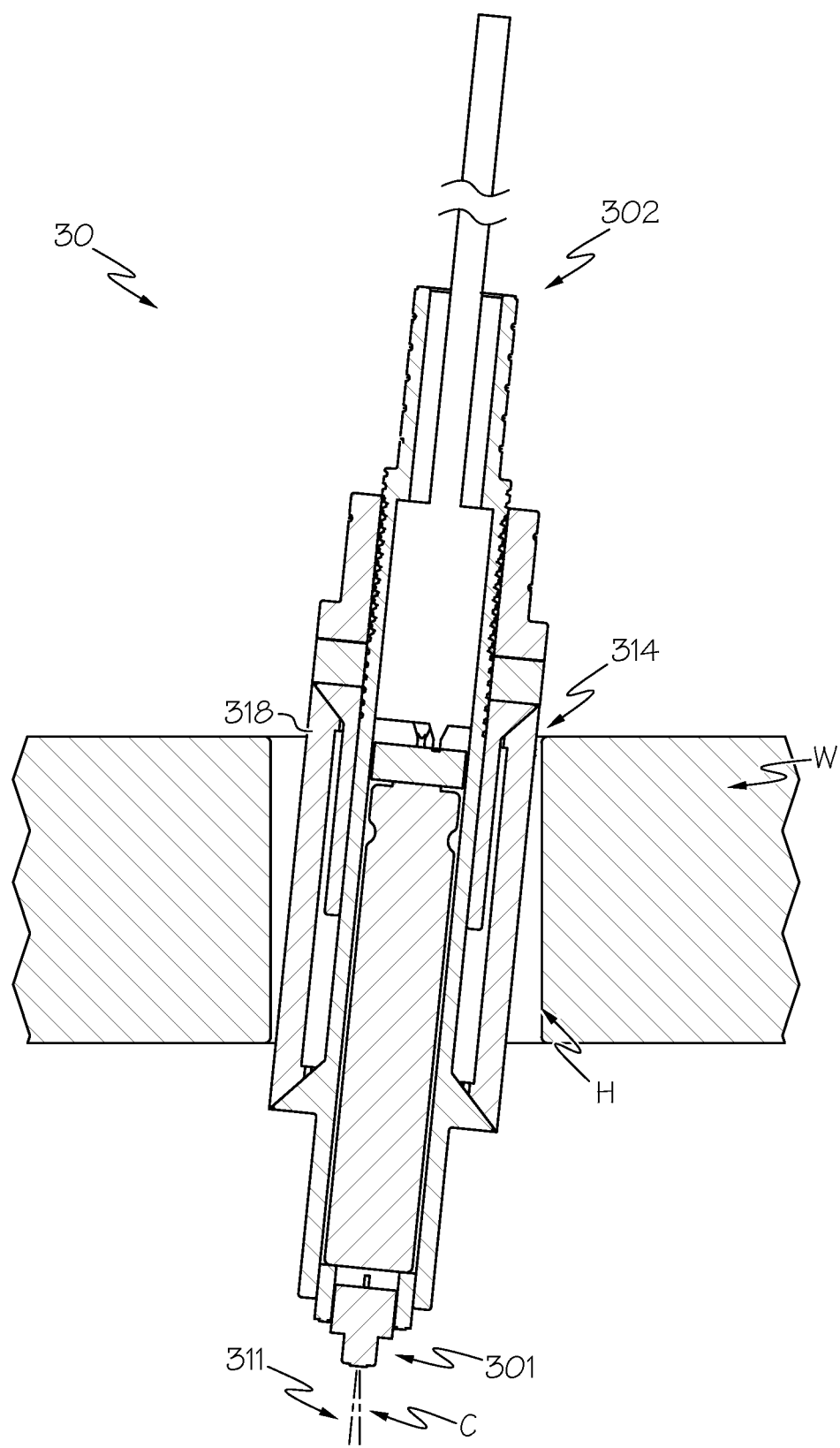
FIG. 15A is cross-sectional view of the hole location target of FIG. 13 inserted into a hole of a workpiece in a radially contracted state.
Figure 15B:
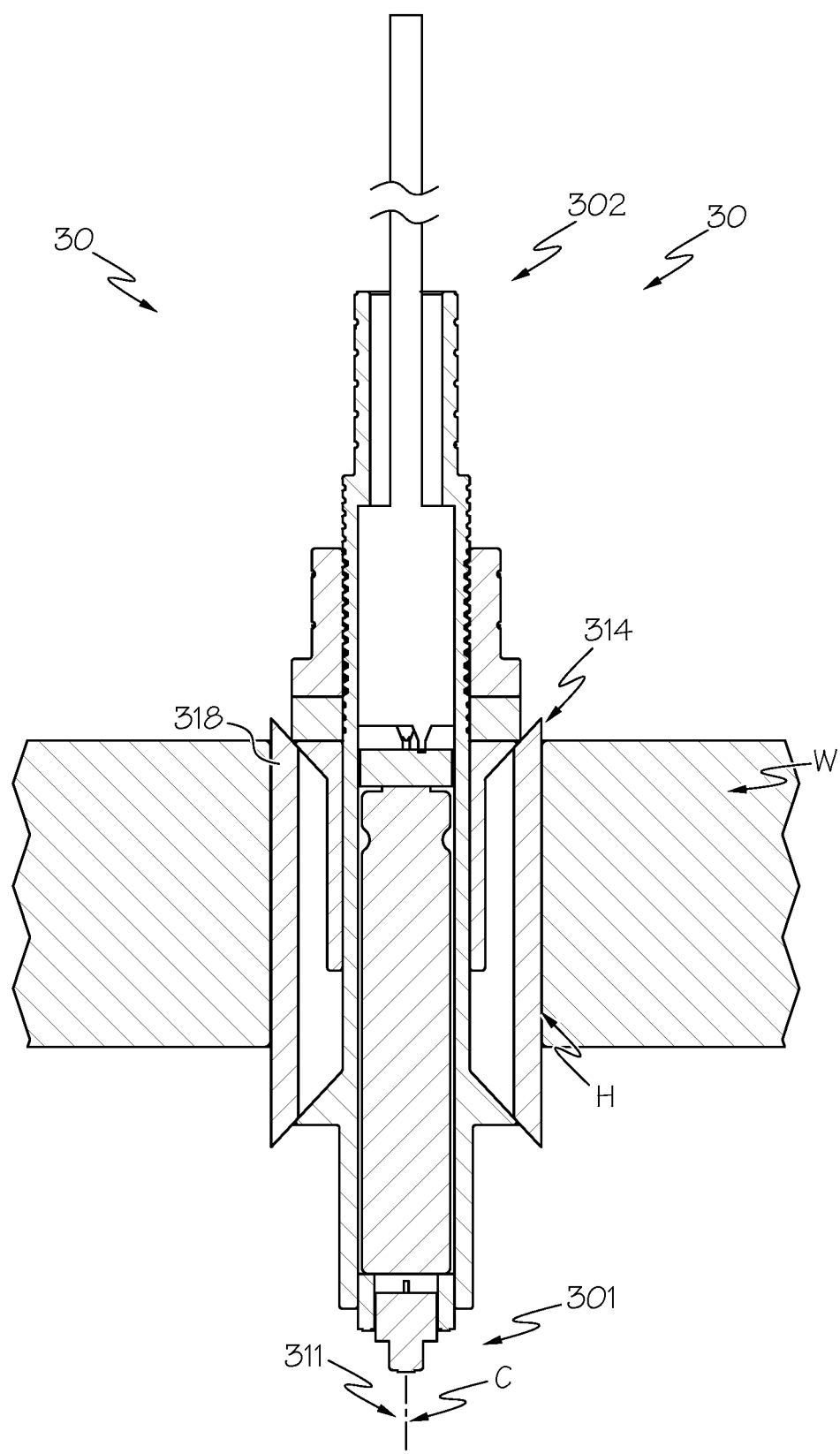
FIG. 15B is cross-sectional view of the hole location target of FIG. 15A in a radially expanded state.

FIG. 13 is a perspective view of an exemplary hole location target according to a third embodiment of the present description in an assembled state. FIG. 14 is an exploded perspective view of the hole location target of FIG. 13. FIG. 15A is cross-sectional view of the hole location target of FIG. 13 inserted into a hole of a workpiece W in a radially contracted state. FIG. 15B is cross-sectional view of the hole location target of FIG. 15A in a radially expanded state.

Referring to FIGS. 13, 14, 15A, and 15B, the hole location target 30 includes a first end 301 configured to be inserted into a hole H of a workpiece W and a second end 302 opposite to the first end 301.

The hole location target 30 includes a self-centering insert 310 and a laser beam emitter 320 attached to the self-centering insert 310. The self-centering insert 310 is positioned near the first end 301 and the laser beam L is emitted near the second end 302 such that the self-centering insert 310 can be inserted into the hole H of the workpiece and the laser beam L can be emitted outside of the hole H of the workpiece W. The self-centering insert 310 has a centerline 311 and the axis of the emitted laser beam L is concentric to the centerline 311 of the self-centering insert 310.

The self-centering insert 310 is configured to be inserted into the hole H of the workpiece W and to be self-centered such that the centerline 311 of the self-centering insert 310 is positioned coaxially with a respective centerline C of the hole H of the workpiece W. By centering the centerline 311 of the self-centering insert 310 to be coaxial with the centerline C of the hole H of the workpiece W, a method that measures a location of the centerline 311 of the self-centering insert 310 can be employed to determine a location of the centerline C of the hole H of the workpiece W. Furthermore, by making the axis of the emitted laser beam L to be concentric to the centerline 311 of the self-centering insert 310, a method that measures the location of the emitted laser beam L can be employed to determine the location of the centerline 311 of the self-centering insert 310 and, thus, to determine the location of the centerline C of the hole H of the workpiece W. In an aspect, the axis of the emitted laser beam is concentric to the centerline of the self-centering insert to 5 µm or less.

In the illustrated example, the self-centering insert 310 of the first embodiment includes a radially expandable bushing 312. It will be understood that the radially expandable bushing 312 can include any tubular structure capable of inserting into the hole H of the workpiece W and capable of radially expanding to self-center the centerline 311 of the self-centering insert 310 to the centerline C of the hole H of the workpiece W. In the illustrated example, the radially expandable bushing 312 takes the form of an expandable collet 314. In an alternative example, the radially expandable bushing 312 can take the form of an expandable bellows such as is illustrated with respect to the first and third embodiments above.

The expandable collet 314 of the present description is a tubular structure in which radially outward force applied to the expandable collet 314 radially expands the expandable collet 314.

In the illustrated example, the expandable collet 314 includes a first collet end 315 and a second collet end 316 and axial beams 318 between the first collet end 315 and the second collet end 316. By applying a radially outward force to the expandable collet 314, the axial beams 318 circumferentially separate and expand radially outward.

As shown in FIG. 15A, reducing the radially outward force applied to the expandable collet 314, the axial beams 318 contract radially, thereby permitting the expandable collet 314 to be inserted into a hole H of a workpiece W. As shown in FIG. 15B, after inserting the expandable collet 314 into the hole H of the workpiece W, the radially outward force is applied to the expandable collet 314 and the axial beams 318 radially expand. The axial beams 318 then contact the walls defining the hole H of the workpiece W, thus causing a self-centering of the centerline 311 of the expandable collet 314 to the respective centerline C of the hole H of the workpiece W.

In the illustrated example, the laser beam emitter 320 is attached to the self-centering insert 310 such that the emitted laser beam L is concentric to the centerline 311 of the self-centering insert 310. By way of example, the laser beam emitter 320 can be fixedly positioned to the self-centering insert 310 such that a position of the laser beam emitter 320 is fixed with respect to a position of centerline 311 of the self-centering insert 310. The positioning of the laser beam emitter 320 with respect to the position of centerline 311 of the self-centering insert 310 can be permanent.

In the illustrated example, the self-centering insert 310 includes an expansion device 330 configured to apply a force to radially expand the expandable collet 314. In the illustrated example, the expansion device 330 includes a first wedge 340, a second wedge 350, and a collar 360.

As shown, the first wedge 340 has a first wedge lower end 341, a first wedge upper end 342 opposite to the first wedge lower end 341, and a first hollow shaft 343 between the first wedge lower end 341 and the first wedge upper end 342. A first inclined wedge surface 344 is positioned at the first wedge lower end 341 of the first wedge 340. The first inclined wedge surface 344 is configured to engage with an inclined collet surface of the expandable collet 314. Exterior threads 345 are positioned on an exterior surface of the first hollow shaft 343, and a wedge grip 346 is positioned at the first wedge upper end 342 of the first wedge 340. The wedge grip 346 can include a wedge gripping surface 348. The wedge gripping surface 348 can take the form of a knurled surface for improved manually torqueing of the wedge grip 346. Alternatively, the wedge gripping surface 348 can take other forms, such as the of a plurality of faces for torqueing the wedge grip 346 with a tool. The first wedge 340 is sized to pass through an first end of a hollow interior of the expandable collet 314 such that the first inclined wedge surface 344 engages with the inclined collet surface 319 and such that the exterior threads 345 and wedge grip 346 extend past a second end of the hollow interior of the expandable collet 314.

As shown, the second wedge 350 has a second wedge lower end 351, a second wedge upper end 352 opposite to the second wedge lower end 351, and a second hollow shaft 353 between the second wedge lower end 351 and the second wedge upper end 352. A second inclined wedge surface 354 is positioned at the second wedge upper end 352 of the second wedge 350. The second inclined wedge surface 354 is configured to engage with an inclined collet surface 319 of the expandable collet 314. The second hollow shaft 353 is sized to pass through the hollow interior of the expandable collet 314 such that the second inclined wedge surface 354 engages with the inclined collet surface 319.

By engagement of the first inclined wedge surface 344 and the second inclined wedge surface 354 with the inclined collet surfaces 319, an axial movement of the first wedge 340 towards the second wedge 350 results in a radially outward force applied to the expandable collet 314 to circumferentially separate and radially expand the axial beams 318.

The collar 360 can provide axial movement of the first wedge 340 towards the second wedge 350. As shown, the collar 360 includes a first collar portion 361 and a second collar portion 366.

The first collar portion 361 has a first collar lower end 362 and a first collar upper end 363. The first collar upper end 363 can include a wavy upper surface 364 configured to engage with a corresponding wavy surface of the second collar portion, and a first collar bore 365 passes through the first collar portion 361 from the first collar lower end 362 to the first collar upper end 363.

The second collar portion 366 has a second collar lower end 367 and a second collar upper end 368. The second collar portion 366 can include a second collar gripping surface 369. The second collar gripping surface 369 can take the form of a knurled surface for improved manually torqueing of the second collar gripping surface 369. Alternatively, the second collar gripping surface 369 can take other forms, such as the of a plurality of faces for torqueing the second collar gripping surface 369 with a tool. The second collar portion 366 includes interior threads 370 in a bore passing through the second collar portion 366 from the second collar lower end 367 to the second collar upper end 368. The interior threads 370 of the second collar portion 366 are configured to engage with the exterior threads of the first wedge 340 to axially move the first wedge 340 towards the second wedge 350.

Thus, the first wedge 340, the second wedge 350, and the collar 360 form an expansion device 330 configured to apply a radially outward force to the expandable collet 314 by turning the collar 360. However, the expansion device 330 is not limited to the above-described example. In another example, the position of the first wedge 340, the second wedge 350, and the collar 360 can be reversed. In yet another example, the expansion device 330 may take the form of a spring or any other expansion device configured to radially expand the expandable collet 314.

As shown, the hole location target 30 further includes a power device 380. In the illustrated example, the power device 380 includes a battery 381, a power switch 382, and a conduit 383. However, the power device 380 is not limited to the above-described example. In another example, the power device 380 could include a wire connected to an electricity supply.

Figure 16A:
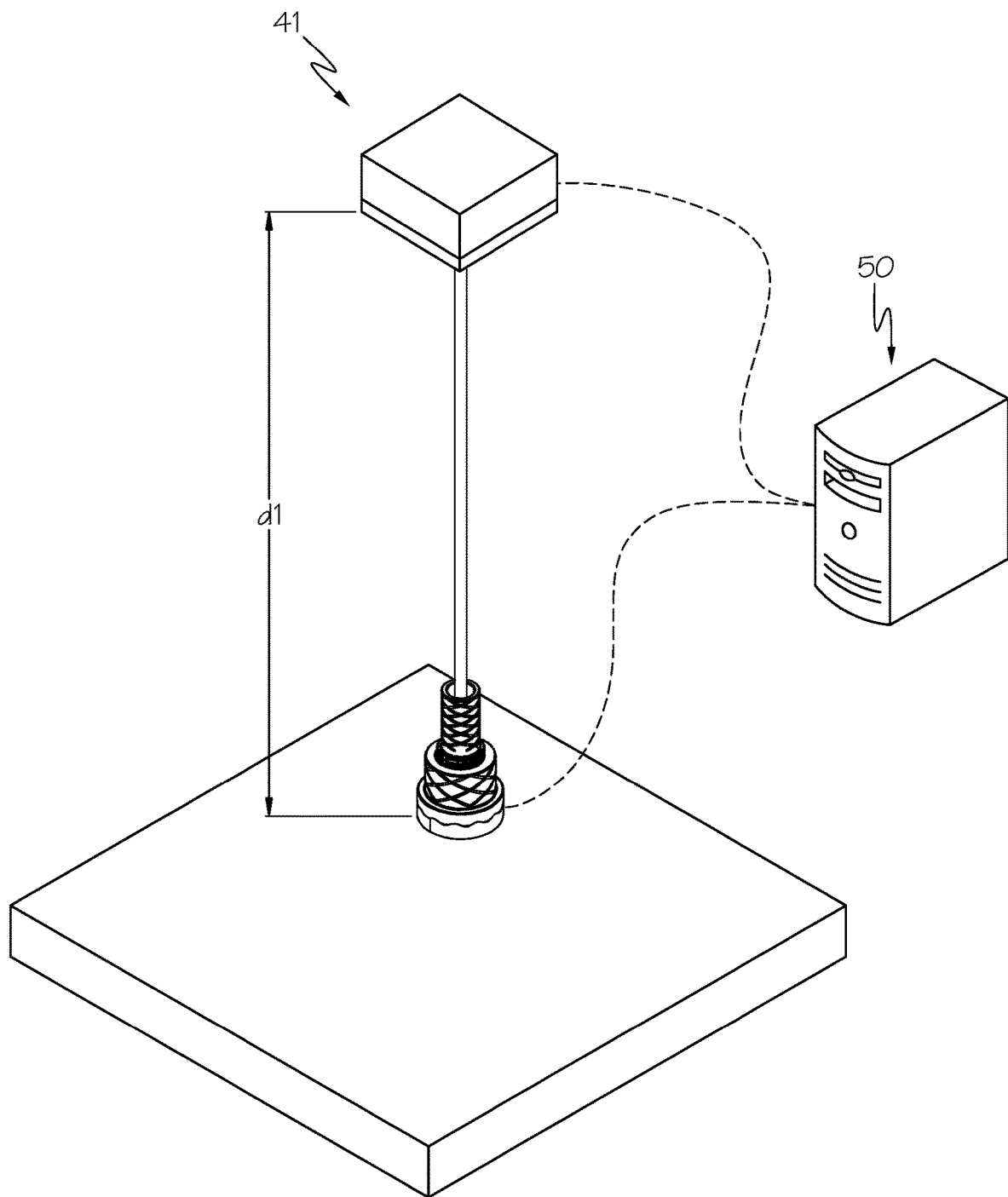
FIGS. 16A and 16B are representations of an exemplary hole location measurement system according to the third embodiment of the present description.
Figure 16B:
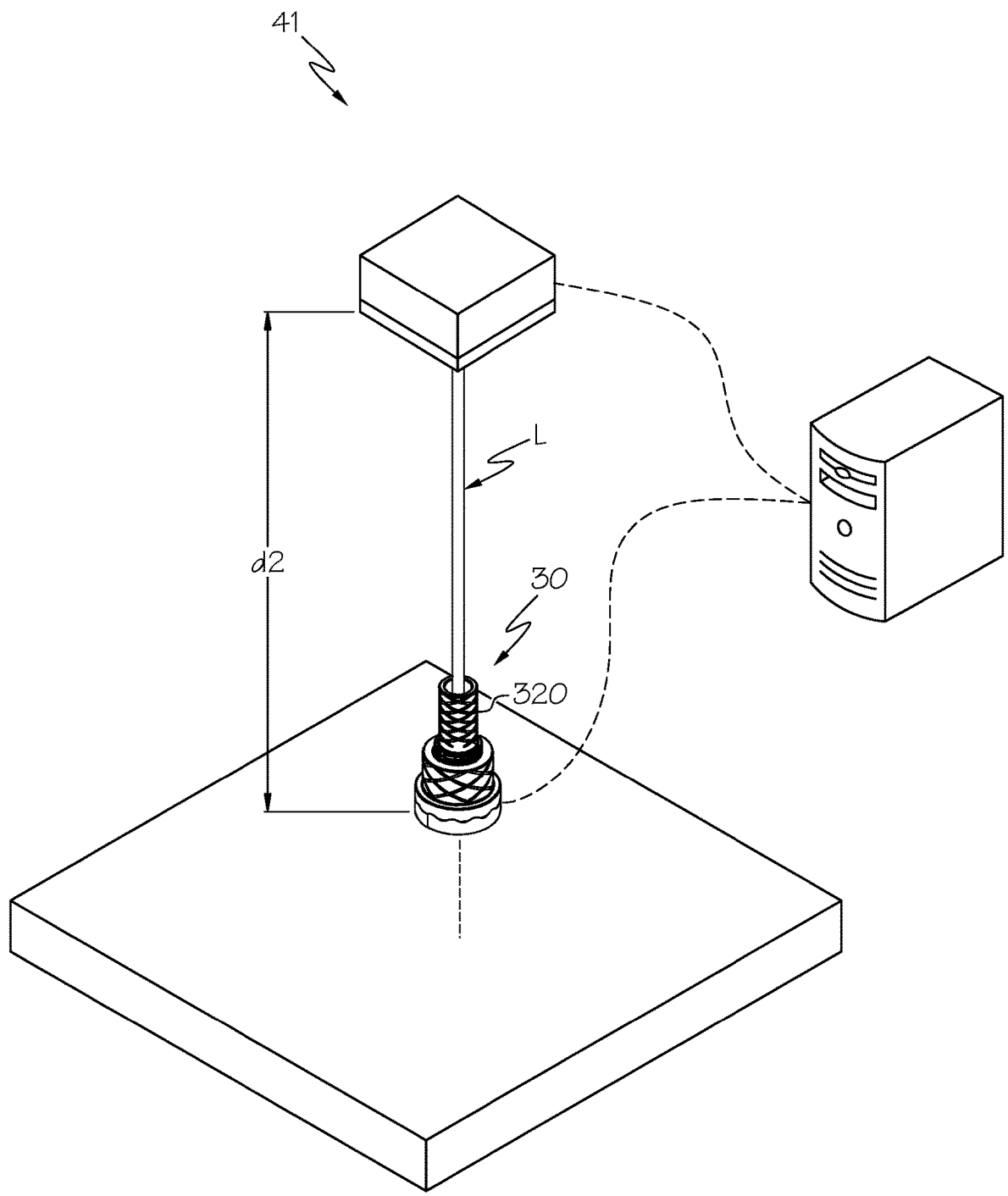

FIG. 16A is a representation of an exemplary hole location measurement system according to the third embodiment of the present description, including an optical sensor at a first distance d1 from the laser beam emitter. FIG. 16B is a representation of the exemplary hole location measurement system according to the third embodiment of the present description, including the optical sensor at a second distance d2 from the laser beam emitter.

The hole location measurement system 300 includes the hole location target 30, in which the axis of the emitted laser beam L is concentric to the centerline 311 of the self-centering insert 310, an optical system 41 sensing the location of the emitted laser beam L at multiple distances from the laser beam emitter 320, and a computer system 50 in communication with the hole location target 30 and optionally the optical system 41. The computer system 50 is configured to determine three-dimensional coordinates of the centerline 311 of the self-centering insert 310 from the sensed locations of the emitted laser beam L. The optical system 41 includes any optical system capable of sensing the location of the emitted laser beam L at multiple distances from the laser beam emitter 320. The computer system 50 may be separate from or integrated with the camera system 40.

In an aspect, hole location measurement system 300 includes a plurality of the hole location targets 30. In another aspect, the optical system 41 is configured to sense the location of multiple emitted laser beams L at the same time. Thus, by sensing the location of multiple emitted laser beams L at the same time, the hole location measurement system 300 enables for measurements of multiple holes at the same time.

The optical system 41 can be a portable optical system. Alternatively, the optical system 41 is of a type supported on an articulating arm.

In an aspect, the laser beam emitter 320 is configured to modulate a power of the emitted laser beam L. By controlling modulation of the emitted laser beam L, laser beam emitter 320 can compensate for environmental conditions, e.g. intensity of background light.

In another aspect, the optical system 41 and/or the computer system 50 is configured to control the modulation of the emitted laser beam L. By controlling modulation of the emitted laser beam L, the hole location measurement system 300 can compensate for environmental conditions, e.g. intensity of background light, by modulating the emitted laser beam L to facilitate sensing of the emitted laser beam L by the optical system 41. Thus, the hole location measurement system 300 can provide for an interactive control of the modulation of the emitted laser beam L based on real-time feedback from the optical system 41 sensing the location of emitted laser beam L.

Furthermore, in an aspect, the emitted laser beam L is modulated to send a signal, and the computer system 50 is configured to extract a signal from the modulated powder of the emitted laser beam L. The signal can be indicative of a status of the hole location target, an identity of the hole location target, or a status of the laser beam emitter.

In an aspect, the laser beam emitter 320 and the optical system 41 can include at least one of matching polarized filters and matching wavelength filters. By way of matching a polarized filter and/or a wavelength filter of the laser beam emitter 320 and the optical system 41, a capability of a hole location measurement system 300 to sense the location of the emitted laser beam L can be enhanced.

Figure 17:
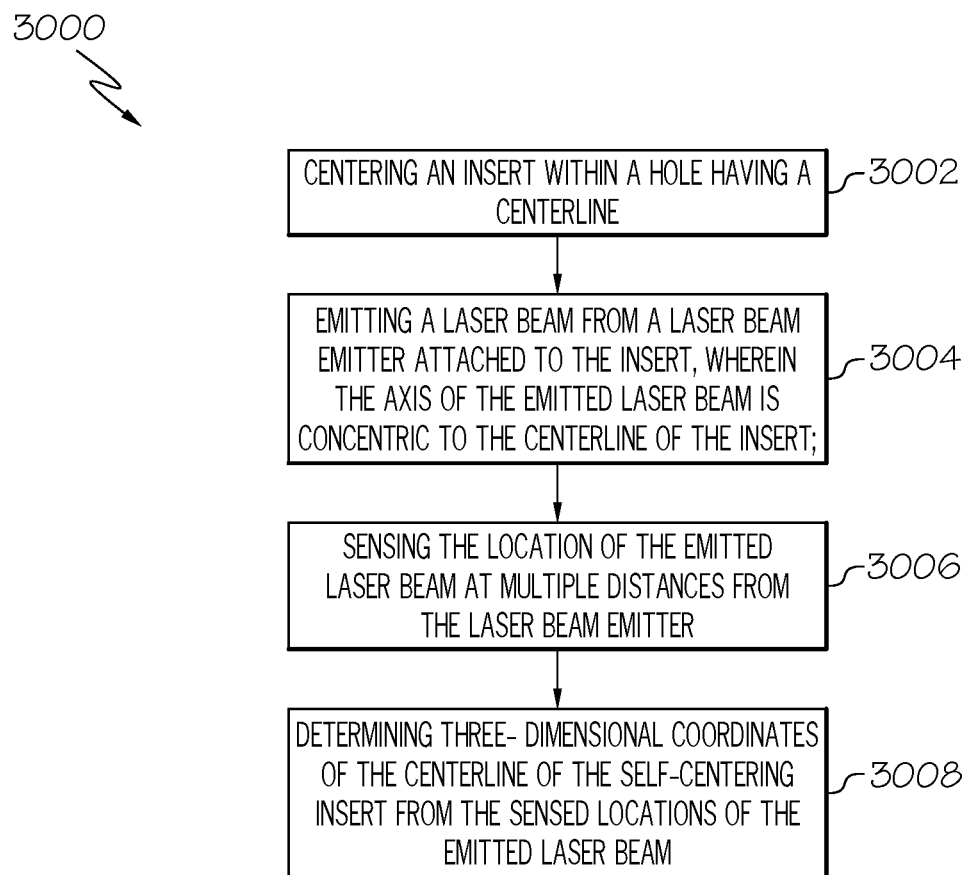
FIG. 17 is a flow diagram of an exemplary method for measuring a location of a hole of a workpiece according to the third embodiment of the present description.

FIG. 17 is a flow diagram of an exemplary method for measuring a location of a hole of a workpiece W according to the third embodiment of the present description.

The method 3000 for measuring a location of a hole H includes, at block 3002, centering an insert within a hole having a centerline. The insert can be the self-centered insert 310 or can be a different insert that is centered by any external means.

The method 3000 further includes, at block 3004, emitting a laser beam from a laser beam emitter attached to the insert, wherein the axis of the emitted laser beam is concentric to the centerline of the insert.

The method 3000 further includes, at block 3006, sensing the location of the emitted laser beam at multiple distances from the laser beam emitter.

The method 3000 further includes, at block 3008, determining three-dimensional coordinates of the centerline of the self-centering insert from the sensed locations of the emitted laser beam.

In an aspect, the method 3000 further includes modulating a power of the emitted laser beam and extracting a signal from the modulated powder of the emitted laser beam. In another aspect, the method 3000 further includes correlating the signal with a status of the hole location target.

In an aspect, the method 3000 further includes correlating the signal with an identity of the hole location target.

In an aspect, the method 3000 further includes correlating the signal with a status of the laser beam emitter.

In an aspect, the method 3000 further includes rotating an article having the hole therein, emitting the laser beam from the laser beam emitter during the rotating, sensing the location of the emitted laser beam at multiple distances from the laser beam emitter during the rotating, and determining three-dimensional coordinates of the centerline of the self-centering insert throughout the rotation from sensed locations of the emitted laser beam.

Figure 18:
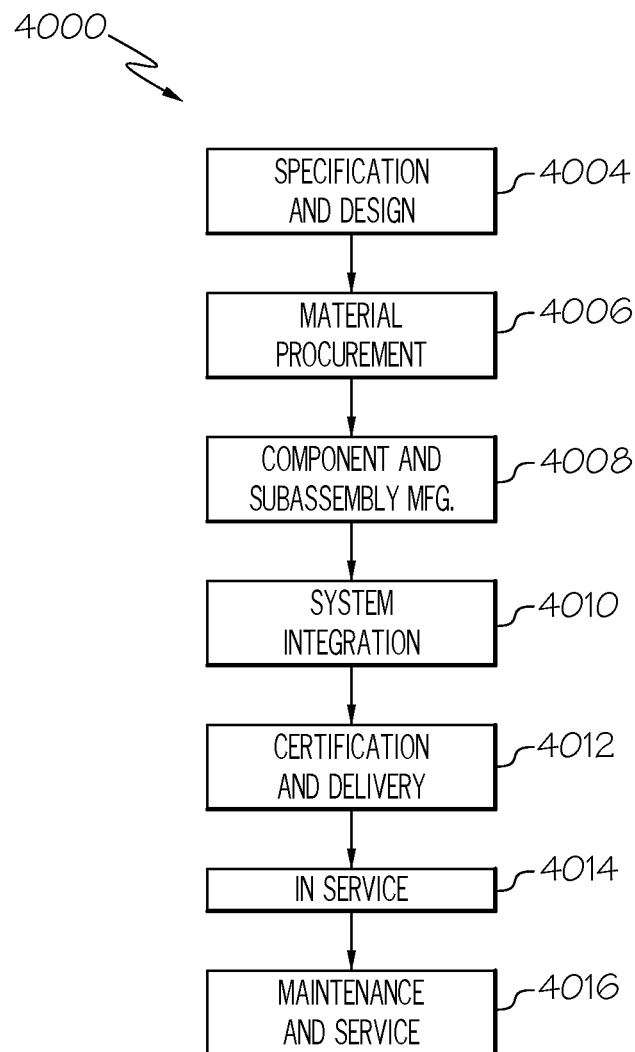
FIG. 18 is a flow diagram of an aircraft manufacturing and service methodology.
Figure 19:
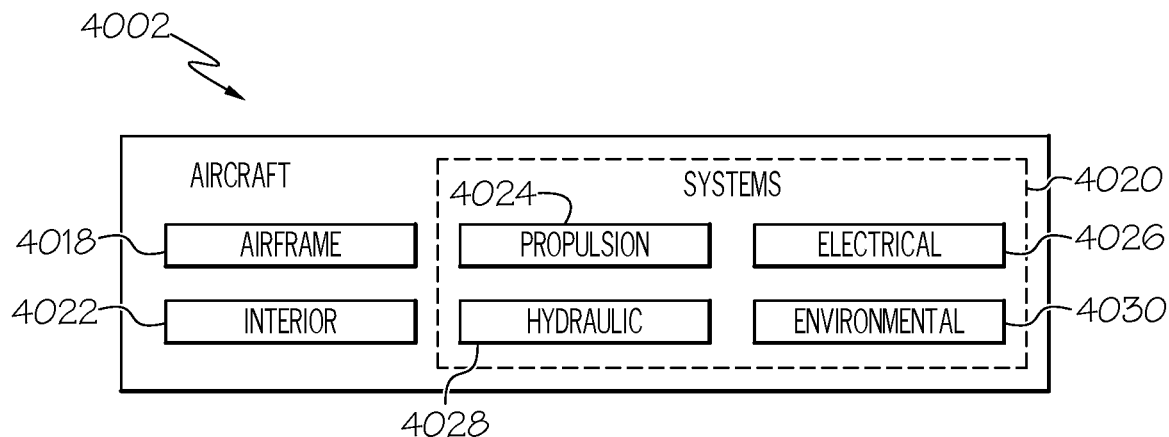
FIG. 19 is a block diagram of an aircraft.

Examples of the present disclosure may be described in the context of an aircraft manufacturing and service method 4000, as shown in FIG. 18, and an aircraft 4002, as shown in FIG. 19. During pre-production, the aircraft manufacturing and service method 4000 may include specification and design 4004 of the aircraft 4002 and material procurement 4006. During production, component/subassembly manufacturing 4008 and system integration 4010 of the aircraft 4002 takes place. Thereafter, the aircraft 4002 may go through certification and delivery 4012 in order to be placed in service 4014. While in service by a customer, the aircraft 4002 is scheduled for routine maintenance and service 4016, which may also include modification, reconfiguration, refurbishment and the like.

Each of the processes of method 4000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The hole location targets, hole location measurement systems, and methods for measuring a location of a hole of the present disclosure may be employed during any one or more of the stages of the aircraft manufacturing and service method 1000, including specification and design 4004 of the aircraft 4002, material procurement 4006, component/subassembly manufacturing 4008, system integration 4010, certification and delivery 4012, placing the aircraft in service 4014, and routine maintenance and service 4016.

As shown in FIG. 19, the aircraft 4002 produced by example method 4000 may include an airframe 4018 with a plurality of systems 4020 and an interior 4022. Examples of the plurality of systems 4020 may include one or more of a propulsion system 4024, an electrical system 4026, a hydraulic system 4028, and an environmental system 4030. Any number of other systems may be included. The hole location targets, hole location measurement systems, and methods for measuring a location of a hole of the present disclosure may be employed for any of the systems of the aircraft 4002.

Although various embodiments of the disclosed hole location targets, hole location measurement systems, and methods for measuring a location of a hole have been shown and described, modifications may occur to those skilled in the art upon reading the specification. The present application includes such modifications and is limited only by the scope of the claims.

What is claimed is:

1. A hole location target comprising:
   a self-centering insert having a centerline, the self-centering insert comprising a radially expandable bushing; and
   an optical target attached to the self-centering insert at a fixed position relative to the centerline of the self-centering insert, the optical target comprising a light-emitting display, the light-emitting display comprising a two-dimensional pattern thereon.

2. The hole location target of claim 1 wherein the radially expandable bushing comprises an expandable bellows.

3. The hole location target of claim 2 wherein the expandable bellows comprises a first bellows end, a second bellows end and one or more radial ridges positioned between the first bellows end and the second bellows end.

4. The hole location target of claim 1 wherein the radially expandable bushing comprises an expandable collet.

5. The hole location target of claim 1 wherein the light-emitting display comprises at least one of a liquid crystal display (LCD), a light emitted diode (LED), an organic light-emitting diode (OLED), and a quantum dot light emitting diode (QLED).

6. The hole location target of claim 1 wherein positioning the optical target with respect to the position of the centerline of the self-centering insert is permanent.

7. A hole location measurement system comprising:
   a hole location target comprising:
      a self-centering insert having a centerline, the self-centering insert comprising a radially expandable bushing; and
      an optical target attached to the self-centering insert at a fixed position relative to the centerline of the self-centering insert, the optical target comprising a light-emitting display comprising a two-dimensional pattern displayed thereon;
   a camera system configured to capture images of the displayed two-dimensional pattern of the optical target; and
   a computer system configured to control modification of the two-dimensional pattern of the optical target and to determine three-dimensional coordinates of the centerline of the self-centering insert from the images of the two-dimensional pattern of the optical target.

8. The hole location measurement system of claim 7 wherein the hole location target comprises a plurality of the hole location targets.

9. The hole location measurement system of claim 8 wherein the camera system is configured to acquire one or more images of the two-dimensional patterns of the plurality of the hole location targets.

10. The hole location measurement system of claim 9 wherein a single image captured by the camera system includes the two-dimensional patterns of the plurality of the hole location targets.

11. The hole location measurement system of claim 7 wherein the camera system is a three-dimensional optical scanner.

12. The hole location measurement system of claim 7 wherein the camera system is a portable three-dimensional optical scanner.

13. The hole location measurement system of claim 12 wherein the portable three-dimensional optical scanner includes an inertial navigation system.

14. The hole location measurement system of claim 7, wherein the light-emitting display and the camera system comprises at least one of matching polarized filters and matching wavelength filters.

15. The hole location target system of claim 7 wherein the two-dimensional pattern comprises a retroreflective material.

16. A method for measuring a location of a hole, the method comprising:
 centering an insert within a hole having a centerline, wherein centering the insert within the hole comprises radially expanding the insert to press against walls of the hole, and wherein an optical target is attached to the insert at a fixed position relative to the centerline of the insert, the optical target comprising a light-emitting display comprising a two-dimensional pattern thereon; and
 capturing images of the two-dimensional pattern of the optical target;
 modifying the two-dimensional pattern of the optical target; and
 acquiring one or more images of the modified two-dimensional pattern of the optical target.

17. The method of claim 16 wherein modifying the two-dimensional pattern of the optical target comprises changing a size of the two-dimensional pattern.

18. The method of claim 16 wherein modifying the two-dimensional pattern of the optical target comprises modifying an intensity of light of the light-emitting display.

19. The method of claim 16 wherein modifying the two-dimensional pattern of the optical target comprises modifying a wavelength of light of the light-emitting display.

20. The method of claim 16 wherein modifying the two-dimensional pattern of the optical target comprises modifying a polarity of light of the light-emitting display.

21. The method of claim 16 wherein modifying the two-dimensional pattern of the optical target comprises modifying a phase of light of the light-emitting display.

22. The method of claim 16 wherein modifying the two-dimensional pattern of the optical target comprises temporal modulation of light of the light-emitting display.

\* \* \* \* \*